United States Patent
Luciw et al.

(10) Patent No.: US 11,928,602 B2
(45) Date of Patent: Mar. 12, 2024

(54) SYSTEMS AND METHODS TO ENABLE CONTINUAL, MEMORY-BOUNDED LEARNING IN ARTIFICIAL INTELLIGENCE AND DEEP LEARNING CONTINUOUSLY OPERATING APPLICATIONS ACROSS NETWORKED COMPUTE EDGES

(71) Applicant: Neurala, Inc., Boston, MA (US)

(72) Inventors: Matthew Luciw, Boston, MA (US); Santiago Olivera, Brookline, MA (US); Anatoly Gorshechnikov, Newton, MA (US); Jeremy Wurbs, Worcester, MA (US); Heather Marie Ames, Milton, MA (US); Massimiliano Versace, Milton, MA (US)

(73) Assignee: Neurala, Inc., Boston, MA (US)

( * ) Notice: Subject to any disclaimer, the term of this patent is extended or adjusted under 35 U.S.C. 154(b) by 1214 days.

(21) Appl. No.: 15/975,280

(22) Filed: May 9, 2018

(65) Prior Publication Data
US 2018/0330238 A1 Nov. 15, 2018

Related U.S. Application Data

(60) Provisional application No. 62/612,529, filed on Dec. 31, 2017, provisional application No. 62/503,639, filed on May 9, 2017.

(51) Int. Cl.
*G06N 3/08* (2023.01)
*G06F 18/23211* (2023.01)
(Continued)

(52) U.S. Cl.
CPC ....... *G06N 3/084* (2013.01); *G06F 18/23211* (2023.01); *G06F 18/40* (2023.01);
(Continued)

(58) Field of Classification Search
CPC .... G06V 10/255; G06V 10/454; G06V 10/95; G06V 20/13; G06K 9/6222;
(Continued)

(56) References Cited

U.S. PATENT DOCUMENTS

| | | |
|---|---|---|
| 7,587,101 B1 | 9/2009 | Bourdev |
| 7,900,225 B2 | 3/2011 | Lyon et al. |

(Continued)

FOREIGN PATENT DOCUMENTS

| | | |
|---|---|---|
| CN | 106250812 A | 12/2016 |
| CN | 106250931 A | 12/2016 |

(Continued)

OTHER PUBLICATIONS

Schmidhuber, Jurgen, Formal Theory of Creativity, Fun and Intrinsic Motivation (1990-2010), IEEE Transactions on Autonomous Mental Development, vol. 2 Is. 3, Sep. 2010. (Year: 2010).*

(Continued)

*Primary Examiner* — Marshall L Werner
(74) *Attorney, Agent, or Firm* — Smith Baluch LLP

(57) ABSTRACT

Lifelong Deep Neural Network (L-DNN) technology revolutionizes Deep Learning by enabling fast, post-deployment learning without extensive training, heavy computing resources, or massive data storage. It uses a representation-rich, DNN-based subsystem (Module A) with a fast-learning subsystem (Module B) to learn new features quickly without forgetting previously learned features. Compared to a conventional DNN, L-DNN uses much less data to build robust networks, dramatically shorter training time, and learning on-device instead of on servers. It can add new knowledge without re-training or storing data. As a result, an edge device with L-DNN can learn continuously after deployment, eliminating massive costs in data collection and annotation, memory and data storage, and compute power.

(Continued)

This fast, local, on-device learning can be used for security, supply chain monitoring, disaster and emergency response, and drone-based inspection of infrastructure and properties, among other applications.

12 Claims, 13 Drawing Sheets

(51) Int. Cl.

| | | |
|---|---|---|
| *G06F 18/40* | (2023.01) | |
| *G06N 3/04* | (2023.01) | |
| *G06N 3/044* | (2023.01) | |
| *G06N 3/045* | (2023.01) | |
| *G06N 3/084* | (2023.01) | |
| *G06V 10/20* | (2022.01) | |
| *G06V 10/44* | (2022.01) | |
| *G06V 10/764* | (2022.01) | |
| *G06V 10/82* | (2022.01) | |
| *G06V 10/94* | (2022.01) | |
| *G06V 20/17* | (2022.01) | |
| *G06V 20/13* | (2022.01) | |

(52) U.S. Cl.
CPC ........... *G06N 3/0409* (2013.01); *G06N 3/044* (2023.01); *G06N 3/045* (2023.01); *G06N 3/08* (2013.01); *G06V 10/255* (2022.01); *G06V 10/454* (2022.01); *G06V 10/764* (2022.01); *G06V 10/82* (2022.01); *G06V 10/95* (2022.01); *G06V 20/17* (2022.01); *G06V 20/13* (2022.01)

(58) Field of Classification Search
CPC .. G06K 9/6253; G06N 3/0409; G06N 3/0445; G06N 3/0454; G06N 3/08; G06N 3/084
See application file for complete search history.

(56) References Cited

U.S. PATENT DOCUMENTS

| | | | |
|---|---|---|---|
| 8,165,407 B1 | 4/2012 | Khosla et al. | |
| 8,259,995 B1 | 9/2012 | Schendel et al. | |
| 9,361,943 B2 | 6/2016 | Thrun | |
| 9,589,595 B2 | 3/2017 | Gao et al. | |
| 9,626,566 B2 | 4/2017 | Versace et al. | |
| 9,754,190 B1 | 9/2017 | Guttmann | |
| 10,037,471 B2 | 7/2018 | Satzoda et al. | |
| 10,503,976 B2 | 12/2019 | Versace et al. | |
| 10,789,291 B1 | 9/2020 | Zadeh et al. | |
| 2008/0201734 A1 | 8/2008 | Lyon et al. | |
| 2009/0144772 A1 | 6/2009 | Fink et al. | |
| 2009/0196493 A1 | 8/2009 | Widrow et al. | |
| 2011/0010388 A1 | 1/2011 | MacLaurin | |
| 2011/0029533 A1 | 2/2011 | Jayakody et al. | |
| 2011/0052068 A1 | 3/2011 | Cobb et al. | |
| 2012/0072215 A1 | 3/2012 | Yu et al. | |
| 2012/0194649 A1 | 8/2012 | Javidi et al. | |
| 2012/0269436 A1 | 10/2012 | Mensink et al. | |
| 2013/0022242 A1 | 1/2013 | Cobb et al. | |
| 2013/0216094 A1 | 8/2013 | Delean | |
| 2013/0242093 A1 | 9/2013 | Cobb et al. | |
| 2014/0050391 A1 | 2/2014 | Angelova et al. | |
| 2015/0016712 A1 | 1/2015 | Rhoads et al. | |
| 2015/0070526 A1 | 3/2015 | Kinoshita | |
| 2015/0146991 A1 | 5/2015 | Nakano et al. | |
| 2015/0248586 A1 | 9/2015 | Gaidon et al. | |
| 2015/0254555 A1 | 9/2015 | Williams et al. | |
| 2015/0269439 A1 | 9/2015 | Versace et al. | |
| 2015/0324686 A1* | 11/2015 | Julian | G06N 3/08 706/25 |
| 2016/0005175 A1 | 1/2016 | Fujita | |
| 2016/0092751 A1 | 3/2016 | Zavesky et al. | |
| 2016/0140424 A1 | 5/2016 | Wang et al. | |
| 2016/0148079 A1 | 5/2016 | Shen et al. | |
| 2017/0032222 A1 | 2/2017 | Sharma et al. | |
| 2017/0039468 A1 | 2/2017 | Zeiler | |
| 2017/0039469 A1 | 2/2017 | Majumdar et al. | |
| 2017/0061249 A1 | 3/2017 | Estrada et al. | |
| 2017/0140236 A1 | 5/2017 | Price et al. | |
| 2017/0154246 A1 | 6/2017 | Guttmann | |
| 2017/0154269 A1 | 6/2017 | Guttmann | |
| 2017/0154273 A1 | 6/2017 | Guttmann | |
| 2017/0169567 A1 | 6/2017 | Chefd'hotel et al. | |
| 2017/0193298 A1 | 7/2017 | Versace et al. | |
| 2018/0012082 A1 | 1/2018 | Satazoda et al. | |
| 2018/0024547 A1 | 1/2018 | Balachandran et al. | |
| 2018/0053530 A1 | 2/2018 | Moore et al. | |
| 2018/0067631 A1 | 3/2018 | Thiercelin et al. | |
| 2018/0074519 A1 | 3/2018 | Qin et al. | |
| 2018/0091832 A1 | 3/2018 | Zeiler et al. | |
| 2018/0136332 A1 | 5/2018 | Barfield, Jr. et al. | |
| 2018/0149138 A1 | 5/2018 | Thiercelin et al. | |
| 2018/0150694 A1 | 5/2018 | Guttmann | |
| 2018/0150695 A1 | 5/2018 | Guttmann | |
| 2018/0150697 A1 | 5/2018 | Guttmann et al. | |
| 2018/0150698 A1 | 5/2018 | Guttmann et al. | |
| 2018/0336479 A1 | 11/2018 | Guttmann | |
| 2018/0373980 A1 | 12/2018 | Huval | |
| 2019/0095464 A1 | 3/2019 | Xie et al. | |
| 2019/0130231 A1 | 5/2019 | Liu et al. | |
| 2019/0279046 A1 | 9/2019 | Han et al. | |
| 2020/0151446 A1 | 5/2020 | Versace et al. | |

FOREIGN PATENT DOCUMENTS

| | | |
|---|---|---|
| GB | 2491987 B | 3/2013 |
| JP | 2015106197 A | 6/2015 |
| WO | 2019050515 A1 | 3/2019 |

OTHER PUBLICATIONS

Carpenter et al., Fuzzy ART: Fast Stable Learning and Categorization of Analog Patterns by an Adaptive Resonance System, Neural Networks, vol. 4. Is. 6, pp. 759-771, 1991. (Year: 1991).*

Attari et al., Nazr-CNN: Object Detection and Fine-Grained Classification in Crowdsourced UAV Images, Nov. 2016. (Year: 2016).*

Papadopoulos et al., We Don't Need No Bounding Boxes: Training Object Class Detectors Using Only Human Verification, Apr. 2017. (Year: 2017).*

Bendale et al., Towards Open Set Deep Networks, Nov. 2015. (Year: 2015).*

Lee et al., Dual-Memory Deep Learning Architectures for Lifelong Learning of Everyday Human Behaviors, Proceeding of the 25th International Joint Conference on Artificial Intelligence (IJCAI-16), Jul. 2016. (Year: 2016).*

Scherreik et al., Automatic threshold selection for multi-class open set recognition, Proc. SPIE 10202, Automatic Target Recognition XXVII, May 1, 2017. (Year: 2017).*

Adaptive resonance theory, Wikipedia Apr. 30, 2017. Accessed at https://en.wikipedia.org/wiki/Adaptive_resonance_theory on Jan. 22, 2021. 4 pages.

Chilimbi et al., "Project adam: Building an efficient and scalable deep learning training system." 11th {USENIX} Symposium on Operating Systems Design and Implementation ((OSDI} 14). 2014. 13 pages.

Extended European Search Report in European Patent Application No. 18767344.7 dated Dec. 10, 2020, 9 pages.

Extended European Search Report in European Patent Application No. 18799281.3 dated Feb. 4, 2021. 9 pages.

Kasaei et al., "An interactive open-ended learning approach for 3d object recognition." 2014 IEEE international conference on autonomous robot systems and competitions (ICARSC). IEEE, 2014. 6 pages.

Yu et al., "Leveraging knowledge-based inference for material classification." Proceedings of the 23rd ACM International conference on Multimedia. 2015. 4 pages.

(56) References Cited

OTHER PUBLICATIONS

Snider, Greg, et al. "From synapses to circuitry: Using memristive memory to explore the electronic brain." IEEE Computer, vol. 44(2). (2011): 21-28.
Spratling, M. W. (2008). Predictive coding as a model of biased competition in visual attention. Vision Research, 48 (12):1391-1408.
Spratling, M. W. (2012). Unsupervised learning of generative and discriminative weights encoding elementary image components in a predictive coding model of cortical function. Neural Computation, 24(1):60-103.
Spratling, M. W., De Meyer, K., and Kompass, R. (2009). Unsupervised learning of overlapping image components using divisive input modulation. Computational intelligence and neuroscience. 20 pages.
Sprekeler, H. On the relation of slow feature analysis and laplacian eigenmaps. Neural Computation, pp. 1-16, 2011.
Sun, Z. et al., Recognition of SAR target based on multilayer auto-encoder and SNN, International Journal of Innovative Computing, Information and Control, vol. 9, No. 11, pp. 4331-4341, Nov. 2013.
Sutton, R. S., and Barto, A. G. (1998). Reinforcement learning: An introduction(vol. 1, No. 1). Cambridge: MIT press. 10 pages.
Versace, TEDx Fulbright, Invited talk, Washington DC, Apr. 5, 2014. 30 pages.
Tong, F., Ze-Nian Li, (1995). Reciprocal-wedge transform for space-variant sensing, Pattern Analysis and Machine Intelligence, IEEE Transactions on , vol. 17, No. 5, pp. 500-551. doi: 10.1109/34.391393.
Torralba, A., Oliva, A., Castelhano, M.S., Henderson, J.M. (2006). Contextual guidance of eye movements and attention in real-world scenes: the role of global features in object search. Psychological Review, 113(4).766-786.
Van Hasselt, Hado, Guez, Arthur, and Silver, David. Deep reinforcement learning with double q-learning. arXiv preprint arXiv: 1509.06461, Sep. 22, 2015. 7 pages.
Versace, M. (2006) From spikes to interareal synchrony: how attentive matching and resonance control learning and information processing by laminar thalamocortical circuits. NSF Science of Learning Centers PI Meeting, Washington, DC, USA. 1 page.
Versace, M., (2010) Open-source software for computational neuroscience: Bridging the gap between models and behavior. In Horizons in Computer Science Research, vol. 3. 43 pages.
Versace, M., Ames, H., Léveillé, J., Fortenberry, B., and Gorchetchnikov, A. (2008) KInNeSS: A modular framework for computational neuroscience. Neuroinformatics, 2008 Winter; 6(4):291-309. Epub Aug. 10, 2008.
Webster, Bachevalier, Ungerleider (1994). Connections of IT areas TEO and TE with parietal and frontal cortex in macaque monkeys. Cerebal Cortex, 4(5), 470-483.
Wiskott, Laurenz and Sejnowski, Terrence. Slow feature analysis: Unsupervised learning of invariances. Neural Computation, 14(4):715-770, 2002.
Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.
International Search Report and Written Opinion in PCT/US2018/023155, dated Jul. 30, 2018, 19 pages.
International Search Report and Written Opinion dated Aug. 31, 2018 from International Application No. PCT/US2018/031833, 12 pages.
Itti, L., and Koch, C. (2001). Computational modelling of visual attention. Nature Reviews Neuroscience, 2 (3), 194-203.
Itti, L., Koch, C., and Niebur, E. (1998). A Model of Saliency-Based Visual Attention for Rapid Scene Analysis, 1-6.
Jarrett, K., Kavukcuoglu, K., Ranzato, M. A., & LeCun, Y. (Sep. 2009). What is the best multi-stage architecture for object recognition ?. In Computer Vision, 2009 IEEE 12th International Conference on (pp. 2146-2153). IEEE.

John C. Platt, Probabilistic output for support vector machines and comparisons to regularized likelihood methods, Mar. 26, 1999, Advances in Large Margin Classifiers. 11 pages.
Khaligh-Razavi, S.-M et al., Deep Supervised, but Not Unsupervised, Models May Explain IT Cortical Representation, PLOS Computational Biology, vol. 10, Issue 11, 29 pages (Nov. 2014).
Kim, S., Novel approaches to clustering, biclustering and algorithms based on adaptive resonance theory and intelligent control, Doctoral Dissertations, Missouri University of Science and Technology, 125 pages (2016).
Kipfer, P., Segal, M., and Westermann, R. 2004. UberFlow: A GPU-Based Particle Engine. In Proceedings of the SIGGRAPH/Eurographics Workshop on Graphics Hardware 2004, pp. 115-122.
Kolb, A., L. Latta, and C. Rezk-Salama. 2004. "Hardware-Based Simulation and Collision Detection for Large Particle Systems." In Proceedings of the SIGGRAPH/Eurographics Workshop on Graphics Hardware 2004, pp. 123-131.
Kompella, Varun Raj, Luciw, Matthew, and Schmidhuber, J'urgen. Incremental slow feature analysis: Adaptive low-complexity slow feature updating from high-dimensional input streams. Neural Computation, 24(11):2994-3024, 2012.
Kowler, E. (2011). Eye movements: The past 25years. Vision Research, 51(13), 1457-1483. doi:10.1016/j.visres.2010.12.014.
Larochelle H., & Hinton G. (2012). Learning to combine foveal glimpses with a third-order Boltzmann machine. NIPS 2010, 1243-1251.
LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256). IEEE.
Lee, D. D. and Seung, H. S. (1999). Learning the parts of objects by non-negative matrix factorization. Nature, 401 (6755):788-791.
Lee, D. D., and Seung, H. S. (1997). "Unsupervised learning by convex and conic coding." Advances in Neural Information Processing Systems, 9.
Legenstein, R., Wilbert, N., and Wiskott, L. Reinforcement learning on slow features of high-dimensional input streams. PLoS Computational Biology, 6(8), 2010. ISSN 1553-734X. 13 pages.
Léveillé, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA. 8 pages.
Livitz G., Versace M., Gorchetchnikov A., Vasilkoski Z., Ames H., Chandler B., Leveille J. and Mingolla E. (2011) Adaptive, brain-like systems give robots complex behaviors, The Neuromorphic Engineer, : 10.2417/1201101.003500 Feb. 2011. 3 pages.
Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA. 9 pages.
Lowe, D.G.(2004). Distinctive Image Features from Scale-Invariant Keypoints. Journal International Journal of Computer Vision archive vol. 60, 2, 91-110.
Lu, Z.L., Liu, J., and Dosher, B.A. (2010) Modeling mechanisms of perceptual learning with augmented Hebbian re-weighting. Vision Research, 50(4). 375-390.
Mahadevan, S. Proto-value functions: Developmental reinforcement learning. In Proceedings of the 22nd international conference on Machine learning, pp. 553-560. ACM, 2005.
Meuth, J.R. and Wunsch, D.C. (2007) A Survey of Neural Computation on Graphics Processing Hardware. 22nd IEEE International Symposium on Intelligent Control, Part of IEEE Multi-conference on Systems and Control, Singapore, Oct. 1-3, 2007, 5 pages.
Mishkin M, Ungerleider LG. (1982). "Contribution of striate inputs to the visuospatial functions of parieto-preoccipital cortex in monkeys," Behav Brain Res, 6 (1): 57-77.
Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.

(56) References Cited

OTHER PUBLICATIONS

Moore, Andrew W and Atkeson, Christopher G. Prioritized sweeping: Reinforcement learning with less data and less time. Machine Learning, 13(1):103-130, 1993.
Najemnik, J., and Geisler, W. (2009). Simple summation rule for optimal fixation selection in visual search. Vision Research. 49, 1286-1294.
Oh, K.-S., and Jung, K. 2004. GPU implementation of neural networks. Pattern Recognition 37, pp. 1311-1314.
Oja, E. (1982). Simplified neuron model as a principal component analyzer. Journal of Mathematical Biology 15(3), 267-273.
Raijmakers, M.E.J., and Molenaar, P. (1997). Exact Art: A complete implementation of an ART network Neural networks 10 (4), 649-669.
Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.
Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1. 15 pages.
Ren, Y. et al., Ensemble Classification and Regression—Recent Developments, Applications and Future Directions, in IEEE Computational Intelligence Magazine, 10.1109/MCI.2015.2471235, 14 pages (2016).
Riesenhuber, M., & Poggio, T. (1999). Hierarchical models of object recognition in cortex. Nature Neuroscience, 2 (11), 1019-1025.
Riesenhuber, M., & Poggio, T. (2000). Models of object recognition. Nature neuroscience, 3, 1199-1204.
Rublee, E., Rabaud, V., Konolige, K., & Bradski, G. (2011). ORB: An efficient alternative to SIFT or SURF. In IEEE International Conference on Computer Vision (ICCV) 2011, 2564-2571.
Ruesch, J. et al. 2008. Multimodal Saliency-Based Bottom-Up Attention a Framework for the Humanoid Robot iCub. 2008 IEEE International Conference on Robotics and Automation, pp. 962-965.
Rumelhart D., Hinton G., and Williams, R. (1986). Learning internal representations by error propagation. In Parallel distributed processing: explorations in the microstructure of cognition, vol. 1, MIT Press. 45 pages.
Rumpf, M. and Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.
Salakhutdinov, R., & Hinton, G. E. (2009). Deep boltzmann machines. In International Conference on Artificial Intelligence and Statistics (pp. 448-455).
Schaul, Tom, Quan, John, Antonoglou, Ioannis, and Silver, David. Prioritized experience replay. arXiv preprint arXiv: 1511.05952, Nov. 18, 2015. 21 pages.
Schmidhuber, J. (2010). Formal theory of creativity, fun, and intrinsic motivation (1990-2010). Autonomous Mental Development, IEEE Transactions on, 2(3), 230-247.
Schmidhuber, Jürgen. Curious model-building control systems. In Neural Networks, 1991. 1991 IEEE International Joint Conference on, pp. 1458-1463. IEEE, 1991.
Seibert, M., & Waxman, A.M. (1992). Adaptive 3-D Object Recognition from Multiple Views. IEEE Transactions on Pattern Analysis and Machine Intelligence, 14 (2), 107-124.
Sherbakov, L. and Versace, M. (2014) Computational principles for an autonomous active vision system. Ph.D., Boston University, http://search.proquest.com/docview/1558856407. 194 pages.
Sherbakov, L., Livitz, G., Sohail, A., Gorchetchnikov, A., Mingolla, E., Ames, H., and Versace, M (2013b) A computational model of the role of eye-movements in object disambiguation. Cosyne, Feb. 28-Mar. 3, 2013. Salt Lake City, UT, USA. 2 pages.
Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013. 2 pages.
Smolensky, Paul. Information processing in dynamical systems: Foundations of harmony theory. No. CU-CS-321-86. Colorado Univ at Boulder Dept of Computer Science, 1986. 88 pages.
Adelson, E. H., Anderson, C. H., Bergen, J. R., Burt, P. J., & Ogden, J. M. (1984). Pyramid methods in image processing. RCA engineer, 29(6), 33-41.
Aggarwal, Charu C, Hinneburg, Alexander, and Keim, Daniel A. On the surprising behavior of distance metrics in high dimensional space. Springer, 2001. 15 pages.
Alex Krizhevsky, Ilya Sutskever, Geoffrey E. Hinton, ImageNet classification with deep convolutional neural networks, Jun. 2017, Communications of the ACM, vol. 60 Issue 6, pp. 84-90.
Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).
Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino,R., and Pazienza, G. (eds), Springer Verlag. 25 pages.
Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.
Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).
Artificial Intelligence as a Service. Invited talk, Defrag, Broomfield, CO, Nov. 4-6, 2013. 22 pages.
Athiwaratkun et al., "Feature representation in convolutional neural networks." arXiv preprint arXiv:1507.02313 (2015). 6 pages.
Baraldi, A. and Alpaydin, E. (1998). Simplified Art: A new class of ART algorithms. International Computer Science Institute, Berkeley, CA, TR-98-004, 1998. 42 pages.
Baraldi, A. and Alpaydin, E. (2002). Constructive feedforward ART clustering networks—Part I. IEEE Transactions on Neural Networks 13(3), 645-661.
Baraldi, A. and Parmiggiani, F. (1997). Fuzzy combination of Kohonen's and ART neural network models to detect statistical regularities in a random sequence of multi-valued input patterns. In International Conference on Neural Networks, IEEE. 6 pages.
Baraldi, Andrea and Alpaydin, Ethem. Constructive feedforward ART clustering networks—part II. IEEE Transactions on Neural Networks, 13(3):662-677, May 2002. ISSN 1045-9227. doi: 10.1109/tnn.2002.1000131. URL http://dx.doi.org/10.1109/tnn.2002.1000131.
Bengio, Y., Courville, A., & Vincent, P. Representation learning: A review and new perspectives, IEEE Transactions on Pattern Analysis and Machine Intelligence, vol. 35 Issue 8, Aug. 2013. pp. 1798-1828.
Bernhard, F., and Keriven, R. 2005. Spiking Neurons on GPUs. Tech. Rep. 05-15, Ecole Nationale des Ponts et Chauss'es, 8 pages.
Besl, P. J., & Jain, R. C. (1985). Three-dimensional object recognition. ACM Computing Surveys (CSUR), 17(1), 75-145.
Boddapati, V., Classifying Environmental Sounds with Image Networks, Thesis, Faculty of Computing Blekinge Institute of Technology, 37 pages (Feb. 2017).
Bohn, C.-A. Kohonen. 1998. Feature Mapping Through Graphics Hardware. In Proceedings of 3rd Int. Conference on Computational Intelligence and Neurosciences, 4 pages.
Bradski, G., & Grossberg, S. (1995). Fast-learning VIEWNET architectures for recognizing three-dimensional objects from multiple two-dimensional views. Neural Networks, 8 (7-8), 1053-1080.
Brain-inspired computing. Invited keynote address, Bionetics 2010, Boston, MA, USA. 1 page.

(56) References Cited

OTHER PUBLICATIONS

Canny, J.A. (1986). Computational Approach To Edge Detection, IEEE Trans. Pattern Analysis and Machine Intelligence, 8(6):679-698.

Carpenter, G.A. and Grossberg, S. (1987). A massively parallel architecture for a self-organizing neural pattern recognition machine. Computer Vision, Graphics, and Image Processing 37, 54-115.

Carpenter, G.A., and Grossberg, S. (1995). Adaptive resonance theory (ART). In M. Arbib (Ed.), The handbook of brain theory and neural networks. (pp. 79-82). Cambridge, M.A.: MIT press.

Carpenter, G.A., Grossberg, S. and Rosen, D.B. (1991). Fuzzy ART: Fast stable learning and categorization of analog patterns by an adaptive resonance system. Neural Networks 4, 759-771.

Carpenter, Gail A and Grossberg, Stephen. The art of adaptive pattern recognition by a self-organizing neural network. Computer, 21(3):77-88, 1988.

Coifman, R.R. and Maggioni, M. Diffusion wavelets. Applied and Computational Harmonic Analysis, 21(1):53-94, 2006.

Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005. 21 pages.

Davis, C. E. 2005. Graphic Processing Unit Computation of Neural Networks. Master's thesis, University of New Mexico, Albuquerque, NM, 121 pages.

Dosher, B.A., and Lu, Z.L. (2010). Mechanisms of perceptual attention in precuing of location. Vision Res., 40(10-12). 1269-1292.

Ellias, S. A., and Grossberg, S. 1975. Pattern formation, contrast control and oscillations in the short term memory of shunting on-center off-surround networks. Biol Cybern 20, pp. 69-98.

Fazl, A., Grossberg, S., and Mingolla, E. (2009). View-invariant object category learning, recognition, and search: How spatial and object attention are coordinated using surface-based attentional shrouds. Cognitive Psychology 58, 1-48.

Földiák, P. (1990). Forming sparse representations by local anti-Hebbian learning, Biological Cybernetics, vol. 64, pp. 165-170.

Friston K., Adams R., Perrinet L., & Breakspear M. (2012). Perceptions as hypotheses: saccades as experiments. Frontiers in Psychology, 3 (151), 1-20.

Galbraith, B.V, Guenther, F.H., and Versace, M. (2015) A neural network-based exploratory learning and motor planning system for co-robots. Frontiers in Neuroscience, in press. 10 pages.

George, D. and Hawkins, J. (2009). Towards a mathematical theory of cortical micro-circuits. PLOS Computational Biology 5(10), 1-26.

Georgii, J., and Westermann, R. 2005. Mass-spring systems on the GPU. Simulation Modelling Practice and Theory 13, pp. 693-702.

Gorchetchnikov A., Hasselmo M. E. (2005). A biophysical implementation of a bidirectional graph search algorithm to solve multiple goal navigation tasks. Connection Science, 17(1-2), pp. 145-166.

Gorchetchnikov A., Hasselmo M. E. (2005). A simple rule for spike-timing-dependent plasticity: local influence of AHP current. Neurocomputing, 65-66, pp. 885-890.

Gorchetchnikov A., Versace M., Hasselmo M. E. (2005). A Model of STDP Based on Spatially and Temporally Local Information: Derivation and Combination with Gated Decay. Neural Networks, 18, pp. 458-466.

Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.

Gorchetchnikov, A. 2017. An Approach to a Biologically Realistic Simulation of Natural Memory. Master's thesis, Middle Tennessee State University, Murfreesboro, TN, 70 pages.

Grossberg, S. (1973). Contour enhancement, short-term memory, and constancies in reverberating neural networks. Studies in Applied Mathematics 52, 213-257.

Grossberg, S., and Huang, T.R. (2009). Artscene: A neural system for natural scene classification. Journal of Vision, 9 (4), 6.1-19. doi:10.1167/9.4.6.

Grossberg, S., and Versace, M. (2008) Spikes, synchrony, and attentive learning by laminar thalamocortical circuits. Brain Research, 1218C, 278-312 [Authors listed alphabetically].

Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.

Hasselt, Hado Van. Double q-learning. In Advances in Neural Information Processing Systems, pp. 2613-2621,2010.

Hinton, G. E., Osindero, S., and Teh, Y. (2006). A fast learning algorithm for deep belief nets. Neural Computation, 18, 1527-1554.

Hodgkin, A. L., and Huxley, A. F. 1952. Quantitative description of membrane current and its application to conduction and excitation in nerve. J Physiol 117, pp. 500-544.

Hopfield, J. 1982. Neural networks and physical systems with emergent collective computational abilities. In Proc Natl Acad Sci USA, vol. 79, pp. 2554-2558.

Ilie, A. 2002. Optical character recognition on graphics hardware. Tech. Rep. integrative paper, UNCCH, Department of Computer Science, 9 pages.

DJI Introduces DJI Terra to Capture, Visualize and Analyze Drone Data. Newsroom News Mar. 28, 2019. Accessed at https://www.dji.com/newsroom/news/dji-introduces-dji-terra-to-capture-visualize-and-analyze-drone-data on Apr. 8, 2019. 2 pages.

DJI Launches New Era of Intelligent Flying Cameras. Newsroom News Mar. 2, 2016. Accessed at https://www.dji.com/newsroom/news/dji-launches-new-era-of-intelligent-flying-cameras on Apr. 8, 2019. 4 pages.

DJI Mavic Pro: Active Track Mode. Expert World Travel 2018. Accessed at https://expertworldtravel.com/dji-mavic-pro-active-track-mode/ on Apr. 8, 2019. 6 pages.

Estes, DJI Made a New Sort of Super Drone. Gizmodo Oct. 29, 2018. Accessed at https://gizmodo.com/dji-made-a-new-sort-of-super-drone-1830061489 on Apr. 8, 2019. 6 pages.

Grabner et al., "Real-time tracking via on-line boosting." Bmvc. Vol. 1. No. 5. 2006 (10 pages).

International Search Report and Written Opinion in International Patent Application No. PCT/US19/26783 dated Aug. 6, 2019, 13 pages.

International Search Report and Written Opinion in International Patent Application No. PCT/US19/33345 dated Aug. 9, 2019, 13 pages.

Japanese Office Action and English Translation thereof in Japanese App. No. 2019-551365 dated Mar. 25, 2022 8 pages.

Japanese Office Action and English translation thereof in Japanese Application No. 2019-561829 dated May 13, 2022, 11 pages.

Kalal et al. "Forward-backward error: Automatic detection of tracking failures." 2010 20th international conference on pattern recognition. IEEE, 2010 4 pages.

Kestello, How Active Track works on the DJI Mavic Air. DroneDJ Jan. 31, 2018. Accessed at https://dronedj.com/2018/01/31/how-activetrack-works-on-the-dji-mavic-air/ on Apr. 8, 2019. 7 pages.

Nebehay et al. "Consensus-based matching and tracking of keypoints for object tracking." IEEE Winter Conference on Applications of Computer Vision. IEEE, 2014. 8 pages.

Nebehay, Robust object tracking based on tracking-learning-detection. Masters Thesis, Faculty of Informatics, TU Vienna 2012. (60 pages).

Rainmaker, DJI MAVIC Air: How Active Track Really Works !. YouTube Jan. 31, 2018. Accessed at https://www.youtube.com/watch?v=QQa7BvkXfgk&feature=youtu.be on Apr. 8, 2019.

Rolfes "Artificial neural networks on programmable graphics hardware." Game Programming Gems 4 (2004): 373-378.

Versace et al. (2010) Meet MONETA—the brain-inspired chip that will outsmart us all: The Brain of a New Machine. IEEE Spectrum, Dec. 2010. 8 pages.

(56) References Cited

OTHER PUBLICATIONS

You Can Film Like a Pro with DJI Drone "ActiveTrack"—With Video Tutorials. DJI Guides Dec. 17, 2017. Accessed at https://store.dji.com/guides/film-like-a-pro-with-activetrack/ on Apr. 8, 2019. 8 pages.
Japanese Office Action with translation in Japanese Application No. 2019-561829 dated Jan. 6, 2023, 5 pages.
Hendrycks et al. "A baseline for detecting misclassified and out-of-distribution examples in neural networks." arXiv preprint arXiv:1610.02136 (2016), 14 pages.
Official Office Action in European Application No. 18799281.3 dated Dec. 15, 2022, 6 pages.
Office Action and Search Report with translation in Chinese Application No. 201880043894.9 dated Mar. 17, 2023, 17 pages.
Cheng Shu, "Modern diagnostic technique of engines", pp. 43-44, Dec. 12, 2006.
Liu Bailin, "Artificial intelligence and expert system", Xi'an Jiao Tong University Press, pp. 210-215, Feb. 2012.
Office Action with translation in Chinese Application No. 201880043894.9 dated Dec. 9, 2023, 44 pages.

\* cited by examiner

SYSTEMS AND METHODS TO ENABLE CONTINUAL, MEMORY-BOUNDED LEARNING IN ARTIFICIAL INTELLIGENCE AND DEEP LEARNING CONTINUOUSLY OPERATING APPLICATIONS ACROSS NETWORKED COMPUTE EDGES

CROSS-REFERENCE TO RELATED APPLICATION(S)

This application claims the priority benefit, under 35 U.S.C. § 119(e), of U.S. Application No. 62/612,529, filed Dec. 31, 2017, and of U.S. Application No. 62/503,639, filed May 9, 2017. Each of these applications is incorporated herein by reference in its entirety.

BACKGROUND

Traditional Neural Networks, including Deep Neural Networks (DNN) that include many layers of neurons interposed between the input and output layers, require thousands or millions of iteration cycles over a particular dataset to train. These cycles are frequently performed in a high-performance computing sever. In fact, some traditional DNNs may take days or even weeks to be trained, depending on the size of the input dataset.

One technique for training a DNN involves the backpropagation algorithm. The backpropagation algorithm computes changes of all the weights in the DNN in proportion to the error gradient from a labeled dataset, via application of the chain rule in order to backpropagate error gradients. Backpropagation makes small changes to the weights for each datum and runs over all data in the set for many epochs.

The larger the learning rate taken per iteration cycle, the more likely that the gradient of the loss function will settle to a local minimum instead of a global minimum, which could lead to poor performance. To increase the likelihood that the loss function will settle to a global minimum, DNNs decrease the learning rate, which leads to small changes to their weights every training epoch. This increases the number of training cycles and the total learning time.

Advancements of Graphic Processing Units (GPU) technology led to the massive improvement in compute capability for the highly parallel operations used to accomplish training jobs that used to take weeks or months. These jobs can now be completed in hours or days with GPUs, but this is still not fast enough for a real-time knowledge update. Furthermore, utilizing a high-performance computational server for updating a DNN brings up the cost in terms of server prices and energy consumption. This makes it extremely difficult to update the knowledge of DNN based systems on-the-fly, which is desired for many cases of real time operations.

Furthermore, since the gradient of the loss function computed for any single training sample can affect all the weights in the network (due to the typically distributed representations), standard DNNs are vulnerable to forgetting previous knowledge when they learn new objects. Repetitive presentations of the same inputs over multiple epochs mitigates this issue, with the drawback of making it extremely difficult to quickly add new knowledge to the system. This is one reason why learning is impractical or altogether impossible on a computationally limited edge device (e.g., a cell phone, a tablet, or a small form factor processor). Even if the problem of forgetting was solved, learning on edge devices would still be impractical due to the high computational load of the training, the small training steps, and the repetitive presentation of all inputs.

These limitations are true not only for single compute Edges across its deployment lifespan, where the Edge may need to update its knowledge, but also holds for distributed, multi-Edge systems (e.g., smart phones connected in a network, networked smart cameras, a fleet of drones or self-driving vehicles, and the like), where quick sharing of newly acquired knowledge is a desirable property for an intelligent agent across its deployment life cycle.

A processor running a backpropagation algorithm calculates the error contribution of each neuron at the output and distributes the error back through the network layers. The weights of the all neurons are adjusted by calculating the gradient of the loss function. Thus, new training examples cannot be added to a pre-trained network without retraining the old examples, least the network lose the ability to correctly classify the old examples. Losing the ability to correctly classify old examples is called "catastrophic forgetting". This issue of forgetting is particularly relevant when considered in connection with real-time operating machines, which often need to quickly learn and incorporate new information on-the-fly while operating.

In order to learn knowledge, a real-time operating machine that uses a traditional DNN may have to accumulate a large amount of data to retrain the DNN. The accumulated data is transferred from the "Edge" of the real-time operating machine (i.e., the device itself, for example, a self-driving car, a drone, a robot, etc.) to a central server (e.g., a cloud-based server) in order to get the labels from the operator and then retrain the DNN executed on the Edge. The more accumulated data there is, the more expensive the transfer process in terms of time and network bandwidth. In addition, an interleaved training on the central server has to combine the new data with the original data that is stored for the whole life cycle of the system. This creates severe transmission bandwidth and data storage limitations.

In summary, applying conventional backpropagation-based DNN training to a real-time operating system suffers from the following drawbacks:

a. Updating the system with new knowledge on-the-fly is impossible;
b. Learning throughout the deployment cycle of the Edge is impossible without regular communications with the servers and a significant wait time for knowledge update;
c. Learning new information requires server space, energy consumption, and disk space consumption to store all input data indefinitely for further training;
d. Inability to learn on a small form factor computing Edge devices; and
e. Inability to merge knowledge across multiple Edges without engaging slow and expensive server-side retraining and redeployment.

SUMMARY

A Lifelong Deep Neural Network (L-DNN) enables continuous, online, lifelong learning in Artificial Neural Networks (ANN) and Deep Neural Networks (DNN) in a lightweight compute device (Edge) without requiring time consuming, computationally intensive learning. An L-DNN enables real-time learning from continuous data streams, bypassing the need to store input data for multiple iterations of backpropagation learning.

L-DNN technology combines a representation-rich, DNN-based subsystem (Module A) with a fast-learning subsystem (Module B) to achieve fast, yet stable learning of features that represent entities or events of interest. These feature sets can be pre-trained by slow learning methodologies, such as backpropagation. In the DNN-based case, described in detail in this disclosure (other feature descriptions are possible by employing non-DNN methodologies for Module A), the high-level feature extraction layers of the DNN serve as inputs into the fast learning system in Module B to classify familiar entities and events and add knowledge of unfamiliar entities and events on the fly. Module B is able to learn important information and capture descriptive and highly predictive features of the environment without the drawback of slow learning.

L-DNN techniques can be applied to visual, structured light, LIDAR, SONAR, RADAR, or audio data, among other modalities. For visual or similar data, L-DNN techniques can be applied to visual processing, such as enabling whole-image classification (e.g., scene detection), bounding box-based object recognition, pixel-wise segmentation, and other visual recognition tasks. They can also perform non-visual recognition tasks, such as classification of non-visual signal, and other tasks, such as updating Simultaneous Localization and Mapping (SLAM) generated maps by incrementally adding knowledge as the robot, self-driving car, drone, or other device is navigating the environment.

Memory consolidation in an L-DNN keeps memory requirements under control in Module B as the L-DNN learns more entities or events (in visual terms, 'objects' or 'categories'). Additionally, the L-DNN methodology enables multiple Edge computing devices to merge their knowledge (or ability to classify input data) across Edges. The merging can occur on a peer-to-peer basis, by direct exchange of neural network representations between two Modules B, or via an intermediary server that merges representations of multiple Modules B from several Edges. Finally, L-DDN does not rely on backpropagation, thereby dramatically decreasing training time, power requirements, and compute resources to update L-DNN knowledge using new input data.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Continual Learning in Real-Time Operating Machines

Figure 1:
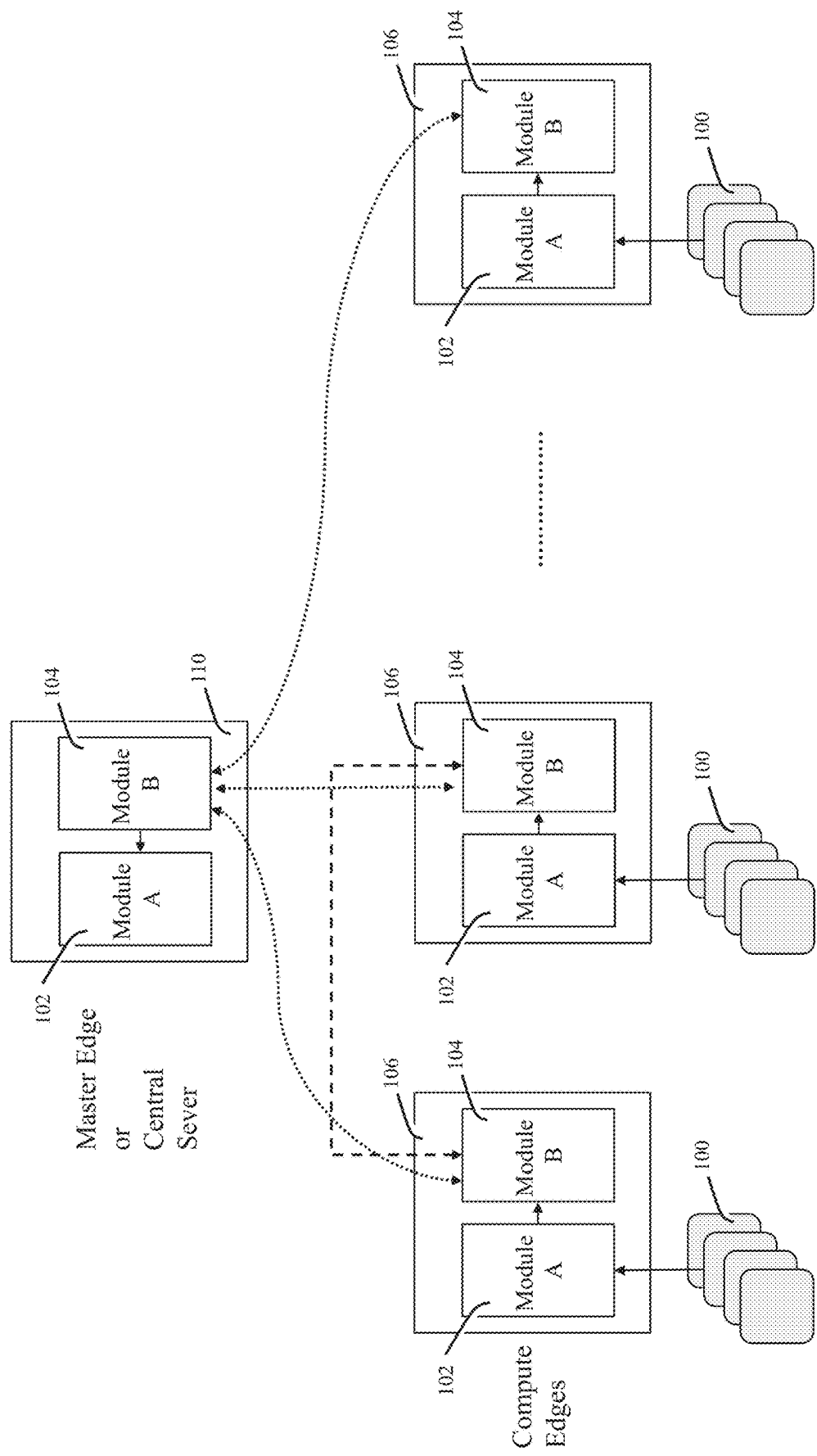
FIG. 1 illustrates an overview of a Lifelong Deep Neural Network (L-DNN) as it relates to multiple compute Edges, either acting individually over a data stream, or connected peer-to-peer or via an intermediary compute server.

A Lifelong Learning Deep Neural Network or Lifelong Deep Neural Network (L-DNN) enables a real-time operating machine to learn on-the fly at the edge without the necessity of learning on a central server or cloud. This eliminates network latency, increases real-time performance, and ensures privacy when desired. In some instances, real-time operating machines can be updated for specific tasks in the field using an L-DNN. For example, with L-DNNs, inspection drones can learn how to identify problems at the top of cell towers or solar panel arrays, smart toys can be personalized based on user preferences without the worry about privacy issues since data is not shared outside the local device, smart phones can share knowledge learned at the Edge (peer to peer or globally with all devices) without shipping information to a central server for lengthy learning, or self-driving cars can learn and share knowledge as they operate.

An L-DNN also enables learning new knowledge without forgetting old knowledge, thereby mitigating or eliminating catastrophic forgetting. In other words, the present technology enables real-time operating machines to continually and optimally adjust behavior at the edge based on user input without a) needing to send or store input images, b) time-consuming training, or c) large computing resources. Learning after deployment with an L-DNN allows a real-time operating machine to adapt to changes in its environment and to user interactions, handle imperfections in the original data set, and provide customized experience for a user.

The disclosed technology can also merge knowledge from multiple edge devices. This merging includes a "crowd collection" and labeling of knowledge and sharing this collected knowledge among edge devices, eliminating hours of tedious centralized labeling. In other words, brains from one or more of the edge devices can be merged either one onto another (peer-to-peer) or into a shared brain that is pushed back to some or all of the devices at the edge. L-DNN ensures that the merging/melding/sharing/combining of knowledge results in a growth in memory footprint that is no faster than linear in the number of objects, happens in real-time, and results in small amount of information exchanged between devices. These features make L-DNNs practical for real-world applications.

An L-DNN implements a heterogeneous Neural Network architecture characterized by two modules:
1) Slow learning Module A, which includes a neural network (e.g., a Deep Neural Network) that is either factory pre-trained and fixed or configured to learn via backpropagation or other learning algorithms based on sequences of data inputs; and
2) Module B, which provides an incremental classifier able to change synaptic weights and representations instantaneously, with very few training samples. Example instantiations of this incremental classifier include, for example, an Adaptive Resonance Theory (ART) network or Restricted Boltzmann Machine (RBM) with contrastive divergence training neural networks, as well as non-neural methods, such as Support Vector Machines (SVMs) or other fast-learning supervised classification processes.

Typical application examples of L-DNN are exemplified by, but not limited to, an Internet of Things (IoT) device that learns a pattern of usage based on the user's habits; a self-driving vehicle that can adapt its driving 'style' from the user, quickly learn a new skill on-the-fly, or park in a new driveway; a drone that is able to learn, on-the-fly, a new class of damage to an infrastructure and can spot this damage after a brief period of learning while in operation; a home robot, such as a toy or companion robot, which is able to learn (almost) instantaneously and without pinging the cloud for its owner's identity; a robot that can learn to recognize and react to objects it has never seen before, avoid new obstacles, or locate new objects in a world map; an industrial robot that is able to learn a new part and how to manipulate it on-the-fly; and a security camera that can learn a new individual or object and quickly find it in imagery provided by other cameras connected to a network. The applications above are only examples of a class of problems that are unlocked and enabled by the innovation(s) described herein, where learning can occur directly in the computing device embedded in a particular application, without being required to undertake costly and lengthy iterative learning on the server.

The technology disclosed herein can be applied to several input modalities, including but not limited to video streams, data from active sensors (e.g., infrared (IR) imagery, LIDAR data, SONAR data, and the like), acoustic data, other time series data (e.g., sensor data, real-time data streams, including factory-generated data, IoT device data, financial data, and the like), and any multimodal linear/nonlinear combination of the such data streams.

Overview of L-DNN

As disclosed above, L-DNN implements a heterogeneous neural network architecture to combine a fast learning mode and a slow learning mode. In the fast learning mode, a real-time operating machine implementing L-DNN learns new knowledge and new experiences quickly so that it can respond to the new knowledge almost immediately. In this mode, the learning rate in the fast learning subsystem is high to favor new knowledge and the corresponding new experiences, while the learning rate in the slow learning subsystem is set to a low value or zero to preserve old knowledge and the corresponding old experiences.

FIG. 1 provides an overview of L-DNN architecture where multiple devices, including a master edge/central server and several compute edges (e.g., drones, robots, smartphones, or other IoT devices), running L-DNNs operate in concert. Each device receives sensory input 100 and feeds it to a corresponding L-DNN 106 comprising a slow learning Module A 102 and a fast learning Module B 104. Each Module A 102 is based on a pre-learned (fixed weight) DNN and serves as feature extractor. It receives the input 100, extracts the relevant features into compressed representations of objects and feeds these representations to the corresponding Module B 104. Module B 104 is capable of fast learning of these object representations. Through the interactions with the user, it receives correct labels for the unfamiliar objects, quickly learns the association between each feature vector and corresponding label, and as a result can recognize these new objects immediately. As multiple L-DNNs 106 learn different inputs, they can connect peer-to-peer (dashed line) or to the central server (dotted line) to meld (fuse, merge, or combine) the newly acquired knowledge and share it with other L-DNNs 106 as disclosed below.

An example object detection L-DNN implementation presented below produced the following pilot results comparing to the traditional object detection DNN "You only look once" (YOLO). The same small (600-image) custom dataset with one object was used to train and validate both networks. 200 of these images were used as validation set. Four training sets of different sizes (100, 200, 300, and 400 images) were created from the remaining 400 images. For L-DNN training, each image in the training set was presented once. For the traditional DNN YOLO, batches were created by randomly shuffling the training set and training proceeded over multiple iterations through these batches. After training, the validation was run on both networks and produced the following mean average precision (mAP) results:

| Training Set Size | 100 | 200 | 300 | 400 |
|---|---|---|---|---|
| YOLO mAP | 0.51 | 0.63 | 0.64 | 0.65 |
| L-DNN mAP | 0.55 | 0.77 | 0.77 | 0.79 |

Furthermore, the training time for L-DNN using 400 images training set was 1.1 seconds; the training time for YOLO was 21.5 hours. This is a shockingly large performance improvement. The memory footprint of the L-DNN was 320 MB, whereas the YOLO footprint was 500 MB. These results clearly show that an L-DNN can achieve better precision then a traditional DNN YOLO and do this with smaller data sets, much faster training time, and smaller memory requirements.

Example L-DNN Architecture

Figure 2:
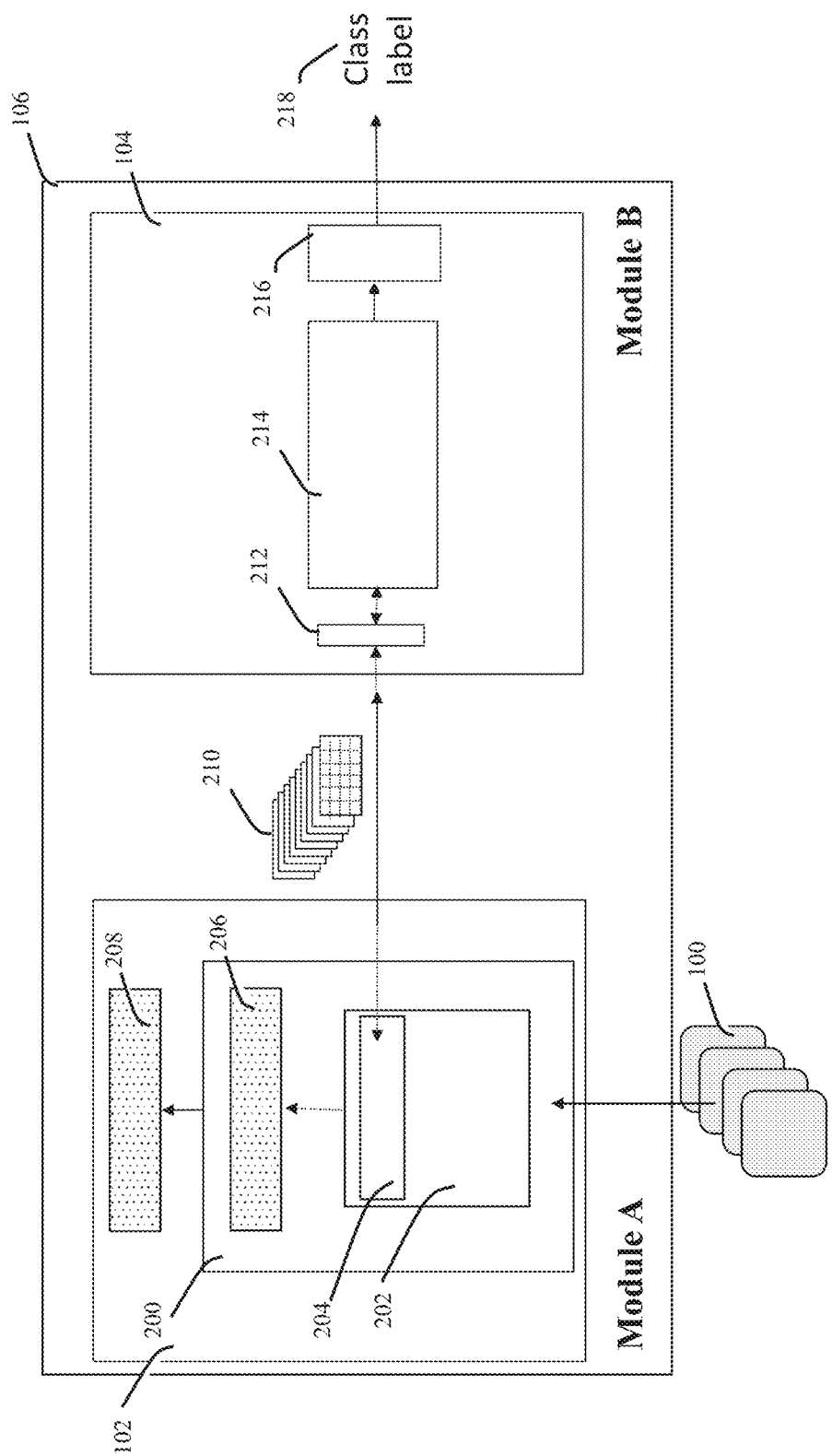
FIG. 2 illustrates an example L-DNN architecture.

FIG. 2 illustrates an example L-DNN architecture used by a real-time operating machine, such as a robot, drone, smartphone, or IoT device. The L-DNN 106 uses two subsystems, slow learning Module A 102 and fast learning Module B 104. In one implementation, Module A includes a pre-trained DNN, and Module B is based on a fast-learning Adaptive Resonance Theory (ART) paradigm, where the DNN feeds to the ART the output of one of the latter feature layers (typically, the last or the penultimate layer before DNN own classifying fully connected layers). Other configurations are possible, where multiple DNN layers can provide inputs to one or more Modules B (e.g., in a multiscale, voting, or hierarchical form).

An input source 100, such as a digital camera, detector array, or microphone, acquires information/data from the environment (e.g., video data, structured light data, audio data, a combination thereof, and/or the like). If the input source 100 includes a camera system, it can acquire a video stream of the environment surrounding the real-time operating machine. The input data from the input source 100 is processed in real-time by Module A 102, which provides a compressed feature signal as input to Module B 104. In this example, the video stream can be processed as a series of image frames in real-time by Modules A and B. Module A and Module B can be implemented in suitable computer processors, such as graphics processor units, field-programmable gate arrays, or application-specific integrated circuits, with appropriate volatile and non-volatile memory and appropriate input/output interfaces.

In one implementation, the input data is fed to a pre-trained Deep Neural Network (DNN) 200 in Module A. The DNN 200 includes a stack 202 of convolutional layers 204 used to extract features that can be employed to represent an input information/data as detailed in the example implementation section. The DNN 200 can be factory pre-trained before deployment to achieve the desired level of data representation. It can be completely defined by a configuration file that determines its architecture and by a corresponding set of weights that represents the knowledge acquired during training.

The L-DNN system 106 takes advantage of the fact that weights in the DNN are excellent feature extractors. In order to connect Module B 104, which includes one or more fast learning neural network classifiers, to the DNN 200 in Module A 102, some of the DNN's upper layers only engaged in classification by the original DNN (e.g., layers 206 and 208 in FIG. 2) are ignored or even stripped from the system altogether. A desired raw convolutional output of high level feature extraction layer 204 is accessed to serve as input to Module B 104. For instance, the original DNN 200 usually includes a number of fully connected, averaging, and pooling layers 206 plus a cost layer 208 that is used to enable the gradient descent technique to optimize its weights during training. These layers are used during DNN training or for getting direct predictions from the DNN 200, but aren't necessary for generating an input for the Module B 104 (the shading in FIG. 2 indicates that layers 206 and 208 are unnecessary). Instead, the input for the neural network classifier in Module B 104 is taken from a subset of the convolutional layers of the DNN 204. Different layers, or multiple layers can be used to provide input to Module B 104.

Each convolutional layer on the DNN 200 contains filters that use local receptive fields to gather information from a small region in the previous layer. These filters maintain spatial information through the convolutional layers in the DNN. The output from one or more late stage convolutional layers 204 in the feature extractor (represented pictorially as a tensor 210) are fed to input neural layers 212 of a neural network classifier (e.g., an ART classifier) in Module B 104. There can be one-to-one or one-to-many correspondence between each late stage convolutional layer 204 in Module A 102 and a respective fast learning neural network classifier in Module B 104 depending on whether the L-DNN 106 is designed for whole image classification or object detection as described in detail in the example implementation section.

The tensor 210 transmitted to the Module B system 104 from the DNN 200 can be seen as an n-layer stack of representations from the original input data (e.g., an original image from the sensor 100). In this example, each element in the stack is represented as a grid with the same spatial topography as the input images from the camera. Each grid element, across n stacks, is the actual input to the Module B neural networks.

The initial Module B neural network classifier can be pre-trained with arbitrary initial knowledge or with a trained classification of Module A 102 to facilitate learning on-the-fly after deployment. The neural network classifier continuously processes data (e.g., tensor 210) from the DNN 200 as the input source 100 provides data relating to the environment to the L-DNN 106. The Module B neural network classifier uses fast, preferably one-shot learning. An ART classifier uses bottom-up (input) and top-down (feedback) associative projections between neuron-like elements to implement match-based pattern learning as well as horizontal projections to implement competition between categories.

In the fast learning mode, when a novel set of features is presented as input from Module A 102, ART-based Module B 104 puts the features as an input vector in F1 layer 212 and computes a distance operation between this input vector and existing weight vectors 214 to determine the activations of all category nodes in F2 layer 216. The distance is computed either as a fuzzy AND (in the default version of ART), dot product, or Euclidean distance between vector ends. The category nodes are then sorted from highest activation to lowest to implement competition between them and considered in this order as winning candidates. If the label of the winning candidate matches the label provided by the user, then the corresponding weight vector is updated to generalize and cover the new input through a learning process that in the simplest implementation takes a weighted average between the new input and the existing weight vector for the winning node. If none of the winners has a correct label, then a new category node is introduced in category layer F2 216 with a weight vector that is a copy of the input. In either case, Module B 104 is now familiar with this input and can recognize it on the next presentation.

The result of Module B 104 serves as an output of L-DNN 106 either by itself or as a combination with an output from a specific DNN layer from Module A 102, depending on the task that the L-DNN 106 is solving. For whole scene object recognition, the Module B output may be sufficient as it classifies the whole image. For object detection, Module B 104 provides class labels that are superimposed on bounding boxes determined from Module A activity, so that each object is located correctly by Module A 102 and labeled correctly by Module B 104. For object segmentation, the bounding boxes from Module A 102 may be replaced by pixel-wise masks, with Module B 104 providing labels for these masks. More details about Module A 102 and Module B 104 are provided below.

Real Time Operation and a Concept of Unknown in Neural Networks

Since L-DNN in general and Module B in particular are designed to operate in real time on continuous sensory input, a neural network in Module B should be implemented so that it is not confused by when no familiar objects are presented to it. A conventional neural network targets datasets that usually contain a labeled object in the input; as a result, it does not need to handle inputs without familiar objects present. Thus, to use such a network in Module B of an L-DNN an additional special category of "Nothing I know" should be added to the network to alleviate Module B's attempts to erroneously classify unfamiliar objects as familiar (false positives).

This concept of "Nothing I know" is useful when processing live sensory stream that can contain exclusively previously unseen and unlabeled objects. It allows Module B and the L-DNN to identify an unfamiliar object as "Nothing I know" or "not previously seen" instead of potentially identifying the unfamiliar object as incorrectly being a familiar object. Extending the conventional design with the implementation of "Nothing I know" concept can be as simple as adding a bias node to the network. The "Nothing I know" concept can also be implemented in a version that automatically scales its influence depending on the number of known classes of objects and their corresponding activations.

One possible implementation of "Nothing I know" concept works as an implicitly dynamic threshold that favors predictions in which the internal knowledge distribution is clearly focused on a common category as opposed to flatly distributed over several categories. In other words, when the neural network classifier in Module B indicates that there is a clear winner among known object classes for an object, then it recognizes the object as belonging to the winning class. But when multiple different objects have similar activations (i.e., there is no clear winner), the system reports the object as unknown. Since learning process explicitly uses a label, the "Nothing I know" implementation may only affect the recognition mode and may not interfere with the learning mode.

Figure 3:
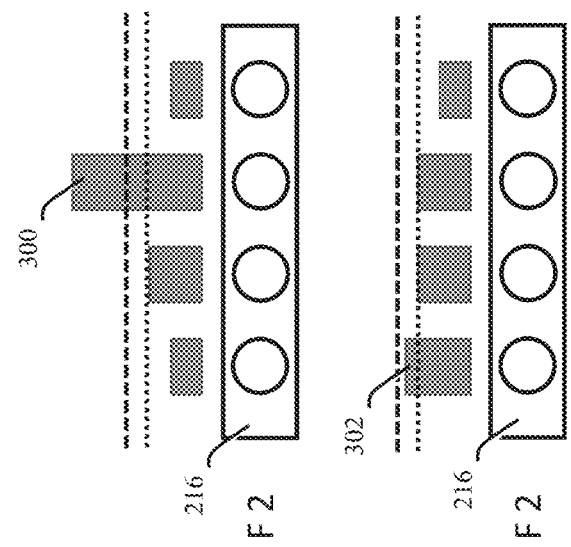
FIG. 3 illustrates an implementation of the concept of unknown in neural networks.

An example implementation of the "Nothing I know" concept using an ART network is presented in FIG. 3. During presentation of an input, the category layer F2 216 responds with an activation pattern across its nodes. The inputs that do contain a familiar object are likely to have prominent winners 300, like in the upper case in FIG. 3. The inputs that do not contain familiar objects are likely to have a flatter distribution of activity in the F2 layer as shown in the lower case in FIG. 3. Calculating the average of all activations and using it as a threshold is insufficient to distinguish these two cases, because even in the second case there may be nodes 302 with activity higher than threshold (dotted lines in FIG. 3). Multiplying the average by a parameter that is no less than 1 raises the threshold (dashed lines in FIG. 3) so that only clear winners 300 remain above it as in the upper case in FIG. 3.

The exact value of this parameter depends on multiple factors and can be calculated automatically based on the number of categories the network has learned and the total number of category nodes in the network. An example calculation is $$\theta = s\frac{C}{N}$$

where $\theta$ is the threshold, C is the number of known categories, N is the number of category nodes, and scaling factor s is set based on the type of DNN used in Module A and is fine-tuned during L-DNN preparation. Setting it too high may increase the false negative rate of the neural network, and setting it too low may increase the false positive rate.

Training a standalone Module B utilizing the "Nothing I know" concept produced following results. 50 objects from the 100 objects in the Columbia Object Image Library 100 (COIL-100) dataset were used as a training set. All 100 objects from the COIL-100 dataset were used as testing set so that 50 novel objects would be recognized as "Nothing I know" by the standalone Module B. During training, an ART classifier in the standalone Module B was fed objects one by one without any shuffling to simulate real time operation. After training, the ART classifier demonstrated a 95.5% correct recognition rate (combined objects and "Nothing"). For comparison, feeding an unshuffled dataset of all 100 objects in the COIL-100 dataset to a conventional ART only produced 55% correct recognition rate. This could be due to the order dependency of ART discussed below.

If an input is not recognized by the ART classifier in Module B, it is up to the user to introduce corrections and label the desired input. If the unrecognized input is of no importance, the user can ignore it and the ART classifier will continue to identify it as "Nothing I know". If the object is important to the user, she can label it, and the fast learning Module B network will add the features of the object and the corresponding label to its knowledge. Module B can engage a tracker system to continue watching this new object and add more views of it to enrich the feature set associated with this object.

Example Implementation of Module A

In operation, Module A extracts features and creates compressed representations of objects. Convolutional deep neural networks are well suited for this task as outlined below.

Convolutional neural networks (CNNs) are DNNs that use convolutional units, where the receptive field of the unit's filter (weight vector) is shifted stepwise across the height and width dimensions of the input. When applied to visual input, the input to the initial layer in the CNN is an image, with height (h), width (w), and one to three channel (c) dimensions (e.g., red, green, and blue pixel components), while the inputs to later layers in the CNN have dimensions of height (h), width (w), and the number of filters (c) from the preceding layers. Since each filter is small, the number of parameters is greatly reduced compared to fully-connected layers, where there is a unique weight projecting from each of (h, w, c) to each unit on the next layer. For convolutional layers, each unit has number of weights equal to (f, f, c) where f is the spatial filter size (typically 3), which is much smaller than either h or w. The application of each filter at different spatial locations in the input provides the appealing property of translation invariance in the following sense: if an object can be classified when it is at one spatial location, it can be classified at all spatial locations, as the features that comprise the object are independent of its spatial locations.

Convolutional layers are usually followed by subsampling (downsampling) layers. These reduce the height (h) and width (w) of their input by reducing small spatial windows (e.g., 2×2) of the input to single values. Reductions have used averaging (average pooling) or taking the maximum value (max pooling). Responses of subsampling layers are invariant to small shifts in the image, and this effect is accumulated over the multiple layers of a typical CNN. In inference, when several layers of convolution and subsampling are applied to an image, the output exhibits impressive stability with respect to various deformations of the input, such as translation, rotation, scaling, and even warping, such as a network trained on unbroken (written without lifting up the pen) handwritten digits having similar responses for a digit "3" from the training set and a digit "3" written by putting small circles together.

These invariances provide a feature space in which the encoding of the input has enhanced stability to visual variations, meaning as the input changes (e.g., an object slightly translates and rotates in the image frame), the output values change much less than the input values. This is enables learning—it can be difficult to learn on top of another method in which, for example, the encoding of two frames with an object translated by a few pixels have little to no similarity.

Further, with the recent use of GPU-accelerated gradient descent techniques for learning the filters from massive datasets, CNNs are able to reach impressive generalization performance for well-trained object classes. Generalization means that the network is able to produce similar outputs for test images that are not identical to the trained images, within a trained class. It takes a large quantity of data to learn the key regularities that define a class. If the network is trained on many classes, lower layers, whose filters are shared among all classes, provide a good set of regularities for all natural inputs. Thus, a DNN trained on one task can provide excellent results when used as an initialization for other tasks, or when lower layers are used as preprocessors for new higher-level representations. Natural images share a common set of statistical properties. The learned features at low-layers are fairly class-independent, while higher and higher layers become more class-dependent, as shown by recent work in visualizing the internals of well-trained neural networks.

An L-DNN exploits these capabilities of CNNs in Module A so that Module B gets the high quality compressed and generalized representations of object features for classification. To increase or maximize this advantage, a DNN used for L-DNN may be pretrained on as many different objects as possible, so that object specificity of the high-level feature layers does not interfere with the fast learning capability of L-DNN.

Example Implementations of Module B

In operation, Module B learns new objects quickly and without the catastrophic forgetting.

Adaptive Resonance Theory (ART)

One example implementation of Module B is an ART neural network. ART avoids catastrophic forgetting by utilizing competition among category nodes to determine a winning node for each object presentation. If and only if this winning node is associated with the correct label for the object, the learning algorithm updates its weights. Since each node is associated with only one object, and the learning algorithm updates weights only for the winning node, any learning episode in ART affects one and only one object. Therefore, there is no interference with previous knowledge when new objects are added to the system; rather, ART simply creates new category nodes and updates the corresponding weights.

Unfortunately, ART as described in the literature has several disadvantages that prevent it from successful use as L-DNN Module B. One of these disadvantages, specifically the lack of the "Nothing I know" concept, is not ART-specific and is discussed above. The list of ART-specific problems and the solutions to these problems are disclosed below.

Classical fuzzy ART does not handle sparse inputs well due to complement coding, which is an integral part of its design. When a sparse input is complement coded, the complement part has high activations in most of the components since complements of zeroes abundantly present in sparse inputs are ones. With all these ones in the complement part of the inputs, it becomes very hard to separate different inputs from each other during distance computation, so the system becomes confused. On the other hand, powerful feature extractors like DNN tend to provide exclusively sparse signals on the high levels of feature extraction. Keeping the ART paradigm but stepping away from the classical fuzzy design and complement coding becomes useful for using ART in Module B of an L-DNN. One of the solutions is to remove complement coding and replace the fuzzy AND distance metric used by fuzzy ART with a dot product based metric. This dot product based metric has the advantage that the result stays normalized and no other changes to fuzzy ART are necessary.

The ART family of neural networks is very sensitive to the order of presentation of inputs. In other words, ART lacks the property of consistency; a different order of inputs leads to a different representation of corresponding objects in the ART network. Unfortunately, real-time operating systems like L-DNN cannot shuffle their training data to provide consistency because they consume their training data as they receive it from the sensors. Frequently during real time operation, the sensors provide most or all samples of a first object before all samples of subsequent objects, so the system learns one object representation at a time. This may lead to the situation where only a few nodes represent the first object, as without competition from other objects the system may not make mistakes and thus refine the object representation properly. On the other hand, the subsequent objects may be overrepresented as the system would squeeze its representation into a hyperspace that is already mostly occupied by the representation of the first object. The "Nothing I know" mechanism described above introduces competition at the early stage and ensures fine grain representation of the first object. The consolidation described below becomes reduces or eliminates overrepresentation for subsequent objects.

Consolidation also reduces the memory footprint of the object representations, which is especially beneficial for edge devices with limited memory. Creating a new category node for every view of an object that the system cannot classify otherwise leads to a constant increase of memory footprint for ART systems as new objects are added as inputs. During real time operation and sequential presentation of objects as described above, the system creates a superlinearly increasing number of nodes for each successive object. In some cases, the system experiences exponential growth in the number of nodes with the number of objects. Thus, the memory footprint of Module B using conventional ART may grow at a rate faster than a linear increase with the number of objects. In the worst case, this growth may be exponential. Consolidation bounds the memory growth to no-faster than linear in with the number of objects and allows creation of fixed size near-optimal representations for each object that an L-DNN learns.

Examples of Complete L-DNN Implementations

L-DNN Classifier

Figure 4:
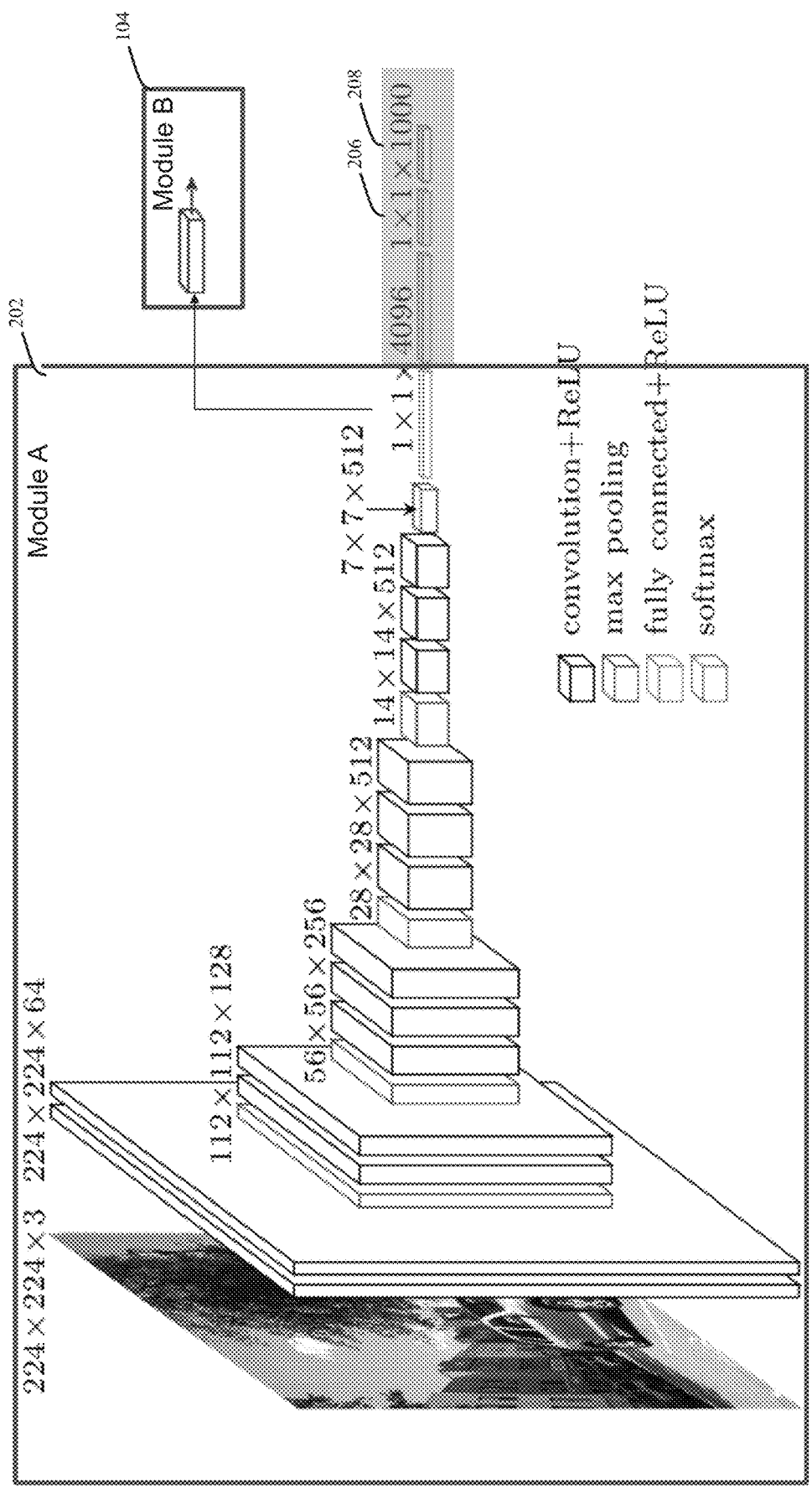
FIG. 4 illustrates a VGG-16-based L-DNN classifier as one example implementation.

FIG. 4 represents example L-DNN implementation for whole image classification using a modified VGG-16 DNN as the core of Module A. Sofmax and the last two fully connected layers are removed from the original VGG-16 DNN, and an ART-based Module B is connected to the first fully connected layer of the VGG-16 DNN. A similar but much simpler L-DNN can be created using Alexnet instead of VGG-16. This is a very simple and computationally cheap system that runs on any modern smartphone, does not require a GPU or any other specialized processor, and can learn any set of objects from a few frames of input provided by the smartphone camera.

L-DNN Grid-Based Detector

One way to detect objects of interest in an image is to divide the image into a grid and run classification on each grid cell. In this implementation of an L-DNN, the following features of CNNs are especially useful.

In addition to the longitudinal hierarchical organization across layers described above, each layer processes data maintaining a topographic organization. This means that irrespective of how deep in the network or kernel, stride, or pad sizes, features corresponding to a particular area of interest on an image can be found on every layer at various resolutions in the similar area of the layer. For example, when an object is in the upper left corner of an image, the corresponding features will be located in the upper left corner of each layer along the hierarchy of layers. Therefore, attaching a Module B to each of the locations in the layer allows the Module B to run classification on a particular location of an image and determine whether any familiar objects are present in this location.

Furthermore, only one Module B must be created per each DNN layer (or scale) used as input because the same feature vector represents the same object irrespective of the position in the image. Learning one object in the upper right corner thus allows Module B to recognize it anywhere in the image. Using multiple DNN layers of different sizes (scales) as inputs to separate Modules B allows detection on multiple scales. This can be used to fine tune the position of the object in the image without processing the whole image at finer scale as in the following process.

In this process, Module A provides the coarsest scale (for example, 7×7 in the publicly available ExtractionNet) image to Module B for classification. If Module B says that an object is located in the cell that is second from the left edge and fourth from top edge, only the corresponding part of the finer DNN input (for example, 14×14 in the same ExtractionNet) should be analyzed to further refine the location of the object.

Figure 5:
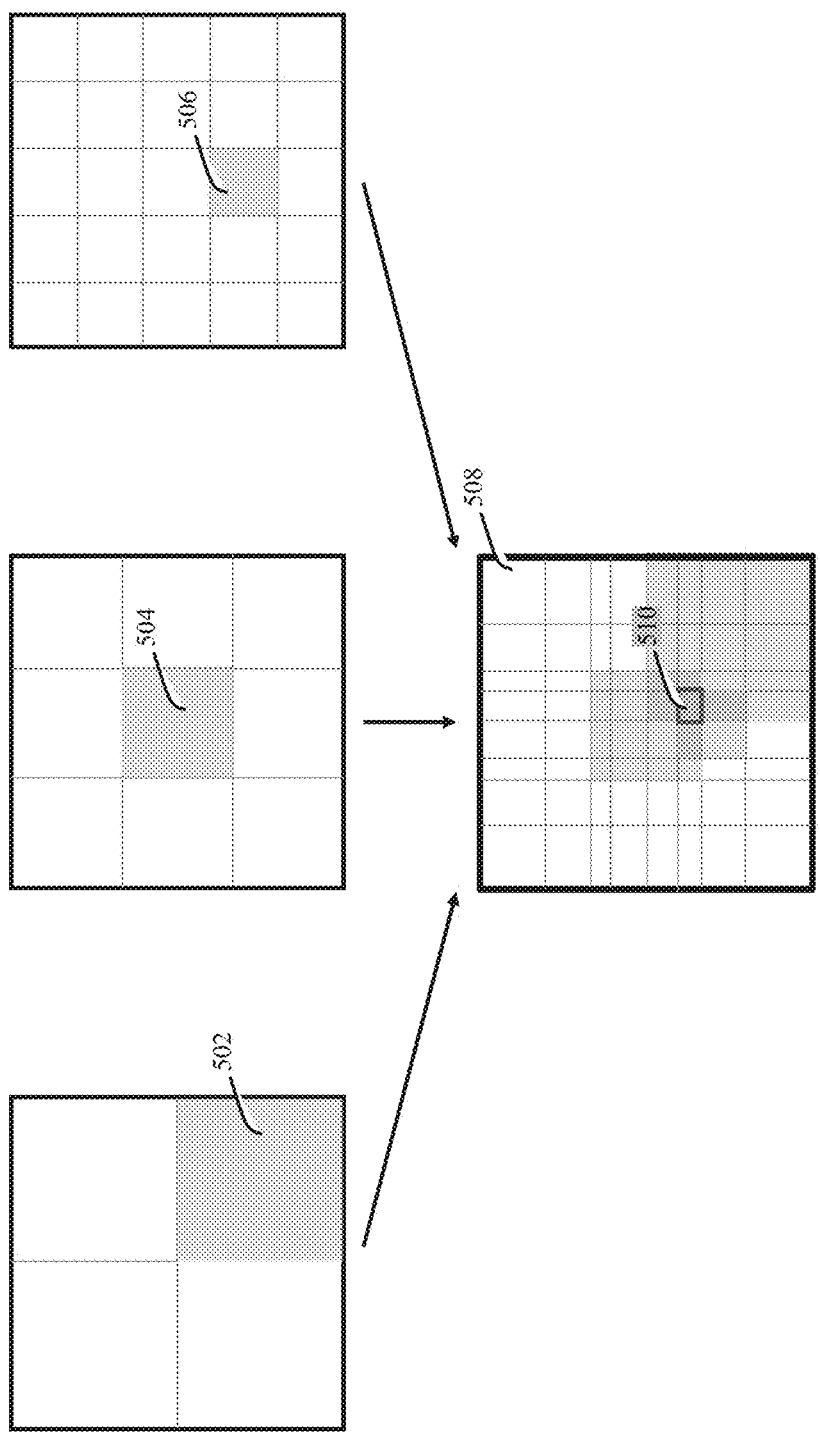
FIG. 5 illustrates non-uniform multiscale object detection.

Another application of multiscale detection can use a DNN design where the layer sizes are not multiples of each other. For example, if a DNN has a 30×30 layer it can be reduced to layers that are 2×2 (compression factor of 15), 3×3 (compression factor of 10), and 5×5 (compression factor of 6). As shown in FIG. 5, attaching Modules B to each of these compressed DNNs gives coarse locations of an object (indicated as 502, 504, 506). But if the output of these Modules B is combined (indicated as 508), then the spatial resolution becomes a nonuniform 8×8 grid with higher resolution in the center and lower resolution towards the edges.

Note that to achieve this resolution, the system runs the Module B computation only (2×2)+(3×3)+(5×5)=38 times, while to compute a uniform 8×8 grid it does 64 Module B computations. In addition to being calculated with fewer computations, the resolution in the multiscale grid in FIG. 5 for the central 36 locations is equal to or finer than the resolution in the uniform 8×8 grid. Thus, with multiscale detection, the system is able to pinpoint the location of an object (510) more precisely using only 60% of the computational resources of a comparable uniform grid. This performance difference increases for larger layers because the square of the sum (representing the number of computations for a uniform grid) grows faster than sum of squares (representing the number of computations for a non-uniform grid).

Non-uniform (multiscale) detection can be especially beneficial for moving robots as the objects in the center of view are most likely to be in the path of the robot and benefit from more accurate detection than objects in the periphery that do not present a collision threat.

L-DNN for Image Segmentation

For images, object detection is commonly defined as the task of placing a bounding box around an object and labeling it with an associated class (e.g., "dog"). In addition to the grid-based method of the previous section, object detection techniques are commonly implemented by selecting one or more regions of an image with a bounding box, and then classifying the features within that box as a particular class, while simultaneously regressing the bounding box location offsets. Algorithms that implement this method of object detection include Region-based CNN (R-CNN), Fast R-CNN, and Faster R-CNN, although any method that does not make the localization depend directly on classification information may be substituted as the detection module.

Image segmentation is the task of determining a class label for all or a subset of pixels in an image. Segmentation may be split into semantic segmentation, where individual pixels from two separate objects of the same class are not disambiguated, and instance segmentation, where individual pixels from two separate objects of the same class are uniquely identified or instanced. Image segmentation is commonly implemented by taking the bounding box output of an object detection method (such as R-CNN, Fast R-CNN, or Faster R-CNN) and segmenting the most prominent object in that box. The class label that is associated with the bounding box is then associated with segmented object. If no class label can be attributed to the bounding box, the segmentation result is discarded. The resulting segmented object may or may not have instance information. One algorithm that implements this method of segmentation is Mask R-CNN.

Figure 6:
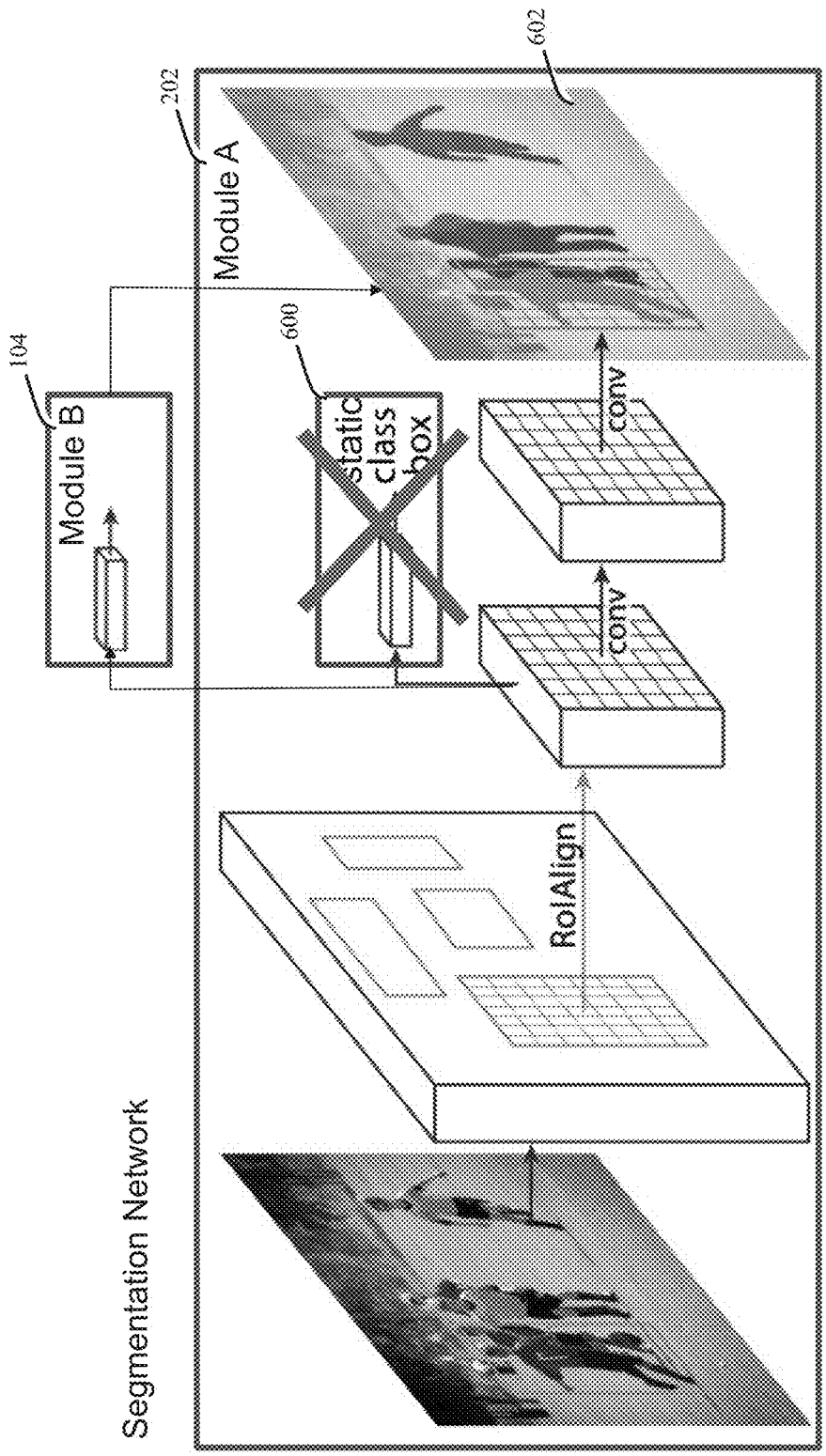
FIG. 6 illustrates a Mask R-CNN-based L-DNN for object segmentation

An L-DNN design for image detection or segmentation based on the R-CNN family of networks is presented in FIG. 6. Consider an image segmentation process that uses a static classification module, such as Mask R-CNN. In this scenario, the static classification module 600 may be replaced with an L-DNN Module B 104. That is, the segmentation pathway of the network remains unchanged; region proposals are made as usual, and subsequently segmented. Just as the case with a static classification module, when the L-DNN Module B 104 returns no positive class predictions that pass threshold (e.g., as would happen when the network is untrained or recognizes segmented area as "Nothing I know" as described above), the segmentation results are discarded. Similarly, when the L-DNN Module B 104 returns an acceptable class prediction, the segmentation results are kept, just as with the static classification module. Unlike the static classification module 600, the L-DNN Module B 104 offers continual adaptation to change state from the former to the latter via user feedback.

User feedback may be provided directly through bounding box and class labels, such as is the case when the user selects and tags an object on a social media profile, or through indirect feedback, such as is the case when the user selects an object in a video, which may then be tracked throughout the video to provide continuous feedback to the L-DNN on the new object class. This feedback is used to train the L-DNN how to classify novel class networks over time. This process does not affect the segmentation component of the network.

The placement of Module B 104 in this paradigm also has some flexibility. The input to Module B 104 should be directly linked to the output of Module A convolutional layers 202, so that class labels may be combined with the segmentation output to produce a segmented, labeled output 602. This constraint may be fulfilled by having both Modules A and B take the output of a region proposal stage. Module A should not depend on any dynamic portion of Module B. That is, because Module B is adapting its network's weights, but Module A is static, if Module B were to change its weights and then pass its output to Module A, Module A would likely see a performance drop due to the inability of most static neural networks to handle a sudden change in the input representation of its network.

Brain Consolidation and Brain Melding

Multiple real-time operating machines implementing L-DNN can individually learn new information on-the-fly through L-DNN. In some situations, it may be advantageous to share knowledge between real-time operating machines as outlined in several use cases described in the next sections. Since the real-time operating machines learn new knowledge on the edge, in order to share the new knowledge, each real-time operating machine sends a compressed and generalized representation of new information (represented in the network in terms of a synaptic weight matrix in Module B) from the edge to a central server or to other real-time operating machine(s). By implementing the following steps, knowledge acquired by each real-time operating machine can be extracted, appended, and consolidated either in a central server or directly on the edge device and shared with other real-time operating machines through centralized or peer-to-peer communication.

Learning new information in field deployment—As discussed above, a real-time operating machine can learn new information on-the-fly through L-DNN. When a user sees that a real-time operating machine is encountering a new object and/or new knowledge, she can provide a label for the new object and trigger the fast learning mode so that the real-time operating machine can learn the new object and/or new knowledge on-the-fly. In this manner, the real-time operating machine can modify its behavior and adapt to the new object and/or new knowledge quickly.

Consolidation of new knowledge—after one or more objects are learned on the fly, the system runs a consolidation process in the fast learning Module B. This process compresses the representation(s) of the new object(s), integrates it with the representations of previously known objects, improves network generalization abilities, and reduces the memory footprint of Module B. An example implementation based on ART network is detailed below.

Communicating consolidated individual brains to other devices—At any point during operation or after completing a mission, a real-time operating machine can transmit the consolidated weight matrix of its fast learning module (Module B) to a central server (e.g., a cloud-based server) through a wired or wireless communication channel. In some instances, the weight matrix of the fast learning module of each real-time operating machine can be downloaded to an external storage device and can be physically coupled to the central server. When the central server is not available or not desirable, the communication can happen in peer-to-peer fashion among real-time operating machines (edge devices).

Brain melding (or fusing, merging, combining)—After the weight matrices from several real-time operating machines are collected at the central server or one of the edge devices, the central server or edge device can run a melding utility that combines, compresses, and consolidates the knowledge that is newly acquired from each real-time operating machine into a single weight matrix. The melding utility reduces the memory footprint of the resulting matrix and removes redundancy while preserving accuracy of the entire system. An example implementation based on ART network is detailed below.

Updating individual brains after melding—The resulting weight matrix that is created during brain melding is then downloaded to one or more real-time operating machines through wired or wireless communication channels or by downloading it to a physical external storage/memory device and physically transferring the storage/memory device to the real-time operating machine.

In this manner, the knowledge from multiple real-time operating machines can be consolidated and new knowledge learned by each of these machines can be shared with other real-time operating machines.

Example Implementation of Brain Consolidation and Melding Process Using ART

Figure 7A:
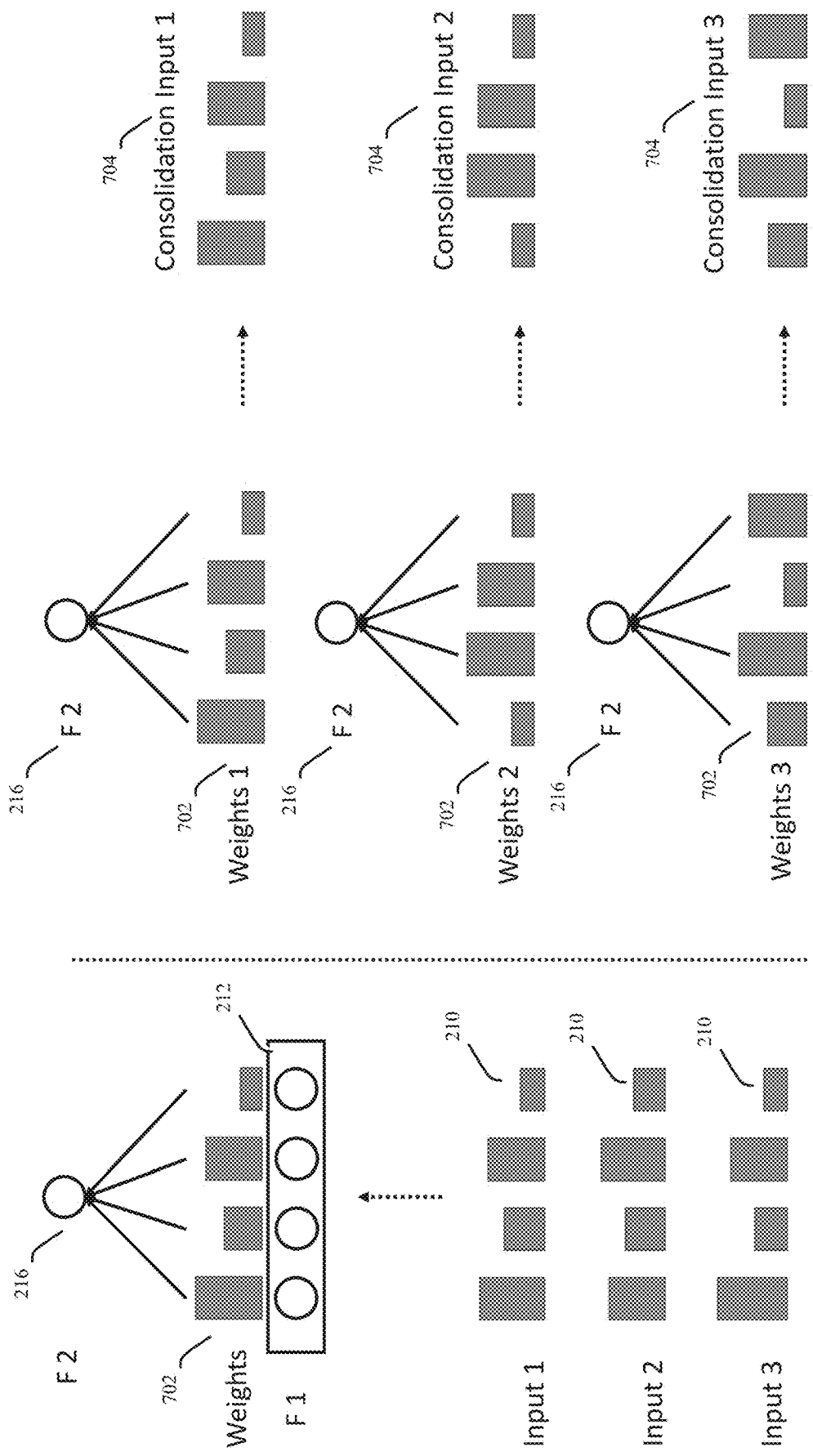
FIG. 7A illustrates consolidation and melding using an Adaptive Resonance Theory (ART) neural network.

FIG. 7A shows an example brain consolidation and melding process using ART. It extends the default ART process as follows. Each of ART's category nodes in layer F2 216 represents a certain object, and each object has one or more category nodes representing it. The left side of FIG. 7A shows a weight pattern 702 for a category node in layer F2 216 activated by layer F1 212. Each weight pattern represents the generalized input pattern that was learned from multiple real feature inputs 210 provided to layer F1 212. Note, that learning in ART only happens when the category node and the corresponding object are winning the competition and correctly identifying the object in question.

The middle of FIG. 7A shows weight patterns 702 for different category nodes in layer F2 216 after multiple inputs 210 for different objects were presented to the ART network. Each weight pattern 702 represents a generalized version of inputs that the corresponding node learned to identify with a corresponding object label. The weight patterns 702 in the middle of FIG. 7A become the consolidation inputs 704 shown at right in FIG. 7A.

The original inputs 210 are generally not available to the system at the time of consolidation or melding. On the other hand, the collection of weight patterns 702 are a generalization over all the inputs 210 that the ART network was exposed to during training. As such, the weight patterns 702 represent the important features of the inputs 210 as well or better than the original inputs 210 and can serve as a substitute for real inputs during training process.

Consolidation uses the weight patterns as substitutes for real inputs. During consolidation the following steps happen:

- The weight vectors 702 in the existing weight matrix (e.g., the matrix of weight vectors 214 in FIG. 2) are added to a consolidation input set (right side of FIG. 7A) $a_i = w_1$ where a are input vectors, w are weight vectors, and i is from 1 to number of existing category nodes in the network. If the ART network uses complement coding, the complement half of the weight vector is decomplemented and averaged with the initial half of the vector $(a_i = (w_i + (1 - w_{ic}))/2)$. Each vector in the consolidation input set receives a corresponding label extracted from its respective category node.
- All existing F2 nodes and corresponding weights are removed from the ART network, so the ART network is in its blank initial state.
- The consolidation input set is randomly shuffled, and the ART network learns this set the same way it learned original inputs. Random shuffling reduces the effect of order dependency in a conventional ART network and allows the ART network to build more compact (fewer category nodes created) and more optimal (better generalization) representation.

Using weights for consolidation input set has a further advantage that a single vector replaces many original input vectors, so that the consolidation processes have reduced complexity and faster computational time than the original learning process.

The consolidation process can happen at any time during L-DNN-based system operation. It reduces the memory footprint of ART-based implementation of Module B and reduces the order dependency of ART-based system. Reducing the order dependency is beneficial for any real-time operating machine based on L-DNN since during such operation there is no way to change the order of sensory inputs that are coming into the system as it operates. Consolidation can be triggered by user action, or automatically when the memory footprint becomes too large (e.g., reaches or exceeds a threshold size), or regularly based on the duration of operation.

Example consolidation was done for the COIL dataset intentionally presented to the ART network as if it was operating in real time and saw objects one after another. Initial training took 4.5 times longer than consolidation training. Consolidation reduced the memory footprint by 25% and improved object recognition performance from 50% correct to 75% correct. For the case where the training dataset was initially shuffled to reduce order artifacts, consolidation still showed performance improvement. There was no significant memory footprint reduction since the system was already well compressed after initial training, but the percent correct for object recognition went up from 87% to 98% on average. These experimental results represent unexpectedly large performance improvements.

Melding is an extension of consolidation where the consolidation training set is combined from weight matrices of more than one ART network. It inherits all the advantages of consolidation and capitalizes on the generalization property of ART networks. As a result, when multiple melded ART networks have knowledge of the same object, all similar representations of this object across multiple ART networks are combined together naturally by the ART learning process, while all distinct representations are preserved. This leads to smart compression of object representations and further reduction of memory footprint of the melded system.

For example, learning 50 objects from the COIL dataset with one ART instance, and learning 33 objects (17 objects being the same for two sets) with another ART instance leads to 92.9% correct for the first instance and 90.5% correct for the second instance. Melding them together creates a network that is 97% correct on all 66 unique objects learned by both ART instances. In addition, the melded version has memory footprint 83% of what the brute force combination of the two networks would have. Furthermore, the memory footprint of the melded version is 3% smaller than the combination of the first network with only new objects of the second network (excluding the overlapping 17 objects). Thus, melding indeed does the smart compression and refines the object representations to increase accuracy. If the inputs are not randomly shuffled, the results of melding are even more prominent in terms of correctness: 85.3 and 77.6% correct networks are melded into a 96.6% correct network that has 84.6% of memory footprint of the two networks combined. These melding experimental results represent unexpectedly large performance improvements.

Using Contextual Information for Improved Performance

Figure 7B:
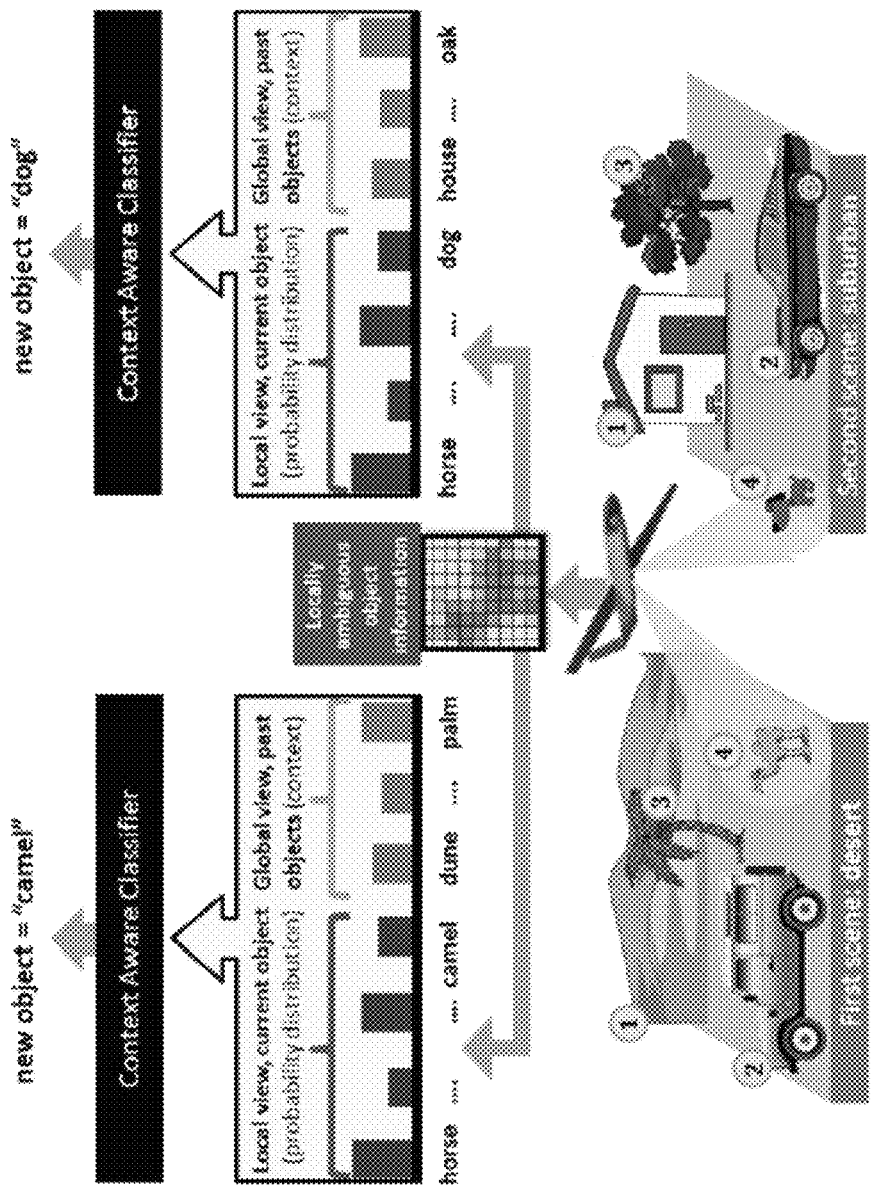
FIG. 7B illustrates how locally ambiguous information, e.g., the pixelated image of a camel (first scene, desert) or a dog (second scene, suburban), can be disentangled by global information about the scene and past associations learned between objects.

The L-DNN-based system can further improve performance accuracy by combining contextual information with current object information. The contextual L-DNN may learn that certain objects are likely to co-occur in the input stream. For example, camels, palm trees, sand dunes, and off-road vehicles are typical objects in a desert scene (see FIG. 7B), whereas a house, sports car, oak tree, and dog are objects typical to a suburban scene. Locally ambiguous information at the pixel level and acquired as a drone input can be mapped to two object classes (e.g., camel or dog) depending on the context. In both cases, the object focus of attention has an ambiguous representation, which is often the case in low-resolution images. In a desert scene, the pixelated image of the camel, can be disentangled by global information about the scene and past associations learned between objects, despite "camel" is only the fourth most likely class inferred by the L-DNN, the most probably being "horse" based on local pixel information alone. Contextual objects (sand dune, off-road vehicle, palm trees) have been in the past associated with "camel," so that the contextual classifier can overturn the "horse" class in favor of the "camel" class. Similarly, in an urban scene containing "house," "sport car," and "oak tree," the same set of pixels could be mapped to a "dog."

As a complement, when objects are identified as ambiguous or anomalous, as is the camel in the above example, the L-DNN system may prompt a human analyst/user to take a closer look at the object. This anomaly detection and alert subsystem can catch the balance between identifying objects of interest that do not belong in the scene and by using context to disambiguate the identity of normal objects.

The infinite regress problem, namely, that an object classification is needed before a contextual module can produce an object class, is sidestepped by giving the label with the maximum probability as an input to the contextual classifier. In this way, at each fixation of an object, the contextual classifier can iteratively refine its guess of the object label.

L-DNN can Leverage Massive Amounts of Unlabeled Data

The massive amounts of unstructured content provide valuable training data for Module A of L-DNN, even without any labels. A technique known as greedy layer-wise pre-training allows DNNs to perform unsupervised learning, by training each layer in turn, from the bottom-up. Mechanisms of layer-wise training include contrastive divergence the de-noising autoencoder and the convolutional auto-encoder. An autoencoder takes an input, encodes it with via the weights and transfer function, and evaluates the output in terms of the input reconstruction error. After a layer has been trained, its output becomes the next layer's input. Pre-trained networks enjoy the benefits of any deep network, namely it often captures useful hierarchical feature relationships, for example learning edges on layer-one, corners and other edge groupings on layer-two, and higher-order data specific features in later layers. Further, the convolutional variant enjoys the built in-translational invariance of convolutional nets.

This process is called pre-training as it tends to precede supervised learning later ("fine-tuning"). In many cases, the performance of a pre-trained network is superior to one without pre-training. Pre-trained nets don't beat non-pre-trained nets in cases where there is a massive quantity of labeled data because labels put some burden on an analyst. Pre-trained "environment-specific" nets will improve the recognition performance of the L-DNN system, over other pre-trained nets, while keeping the labeling burden down. In other words, DNN trained on the unlabeled data plus limited labels resulting from analysts' reports leads to improved performance over those trained from another heavily labeled dataset, as well as the relatively small number of analyst's reports.

Finally, ART as an implementation of Module B has another benefit as it can also perform unsupervised learning. ART can be considered "semi-supervised," meaning it does not need labels for learning, but it is able to take advantage of labels when they are available. ART assists organization of unlabeled data by operating in its unsupervised learning mode, while storing, for each node, the retrieval information for the frame and image region of the observations it was the best match for. Each ART node can allow the analyst to access and examine many similar observations.

Example Use Cases of L-DNN

The following use cases are non-limiting examples of how an L-DNN can address technical problems in a variety of fields.

Using L-DNN to Automate Inspections: Single or Multiple Sources of Imagery

Consider a drone service provider wanting to automate the inspection process for industrial infrastructure, for example, power lines, cell towers, or wind turbines. Existing solutions require an inspector to watch hours of drone videos to find frames that include key components that need to be inspected. The inspector must manually identify these key components in each of the frames.

In contrast, an L-DNN based assistant can be introduced to the identification tool. Data that includes labels for objects or anomalies of interest can be provided to the L-DNN based assistant as a pre-trained set during conventional slow DNN factory training. Additions can be made by the user to this set during fast learning mode as described below.

Figure 8:
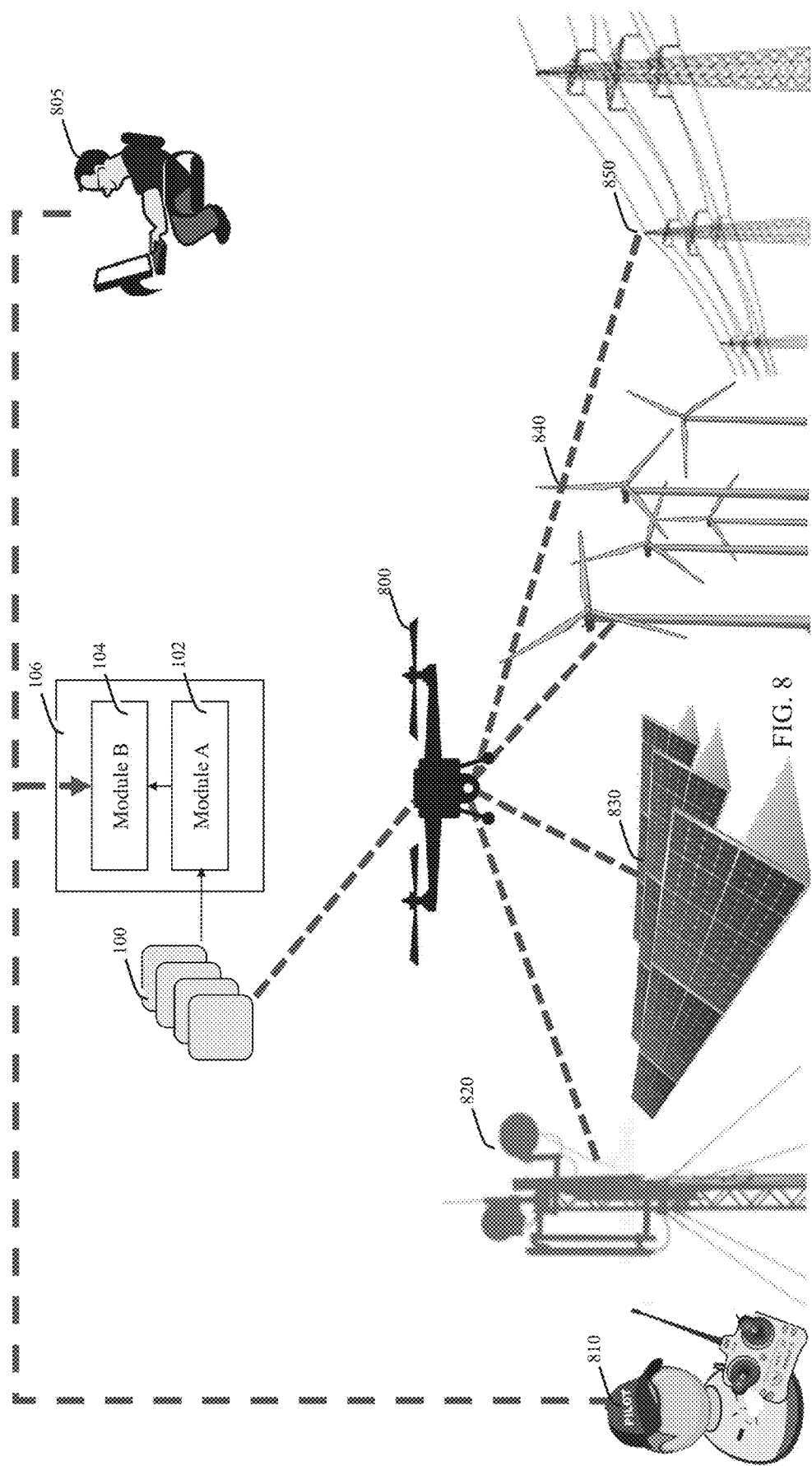
FIG. 8 illustrates an application of an L-DNN to drone-based industrial inspection use case.

FIG. 8 illustrates operation of a L-DNN based assistant that can be included on a "smart" drone or on a computer used to review videos acquired by a "dumb" drone. A drone 800 inspects a structure, such as a telecommunication tower 820, a solar panel array 830, a wind turbine farm 840, or a power line distribution 850 (these are only example structures, others can be envisioned). A drone operator 810 may be using manual control of the drone, or supervising a drone functioning automatically. A human analyst 805, such as an analyst in a control room, can provide labels as the drone is flying, or post flight, to Module B 104 in an L-DNN system 106 that processes sensory input (e.g., video, LIDAR, etc.) 100 from drone 800.

Initially, the drone 800 receives a copy of the L-DNN 106 as its personal local classifier. When the drone 800 acquires video frames 100 while inspecting these power lines 850, cell towers 820, and wind turbines 840, Module A 102 of the L-DNN 106 extracts image features from the video frames 100 based on pre-trained data. Module B 104 then provides a probable label for each object based on these features. This information is passed to the user 805. If the user 805 finds the labels unsatisfactory, she can engage a fast learning mode to update the Module B network with correct labels. In this manner, user-provided information may correct the current label. Thus, the fast learning subsystem can utilize one-trial learning to determine the positions and features of already learned objects, such as power lines, cell towers, and wind turbines, as early as in the first frame after update. In the case of analyzing the video taken earlier, that means immediately after the user introduced correction. The system 106 thus becomes more knowledgeable over time and with user's help provides better identification over time.

Figure 9:
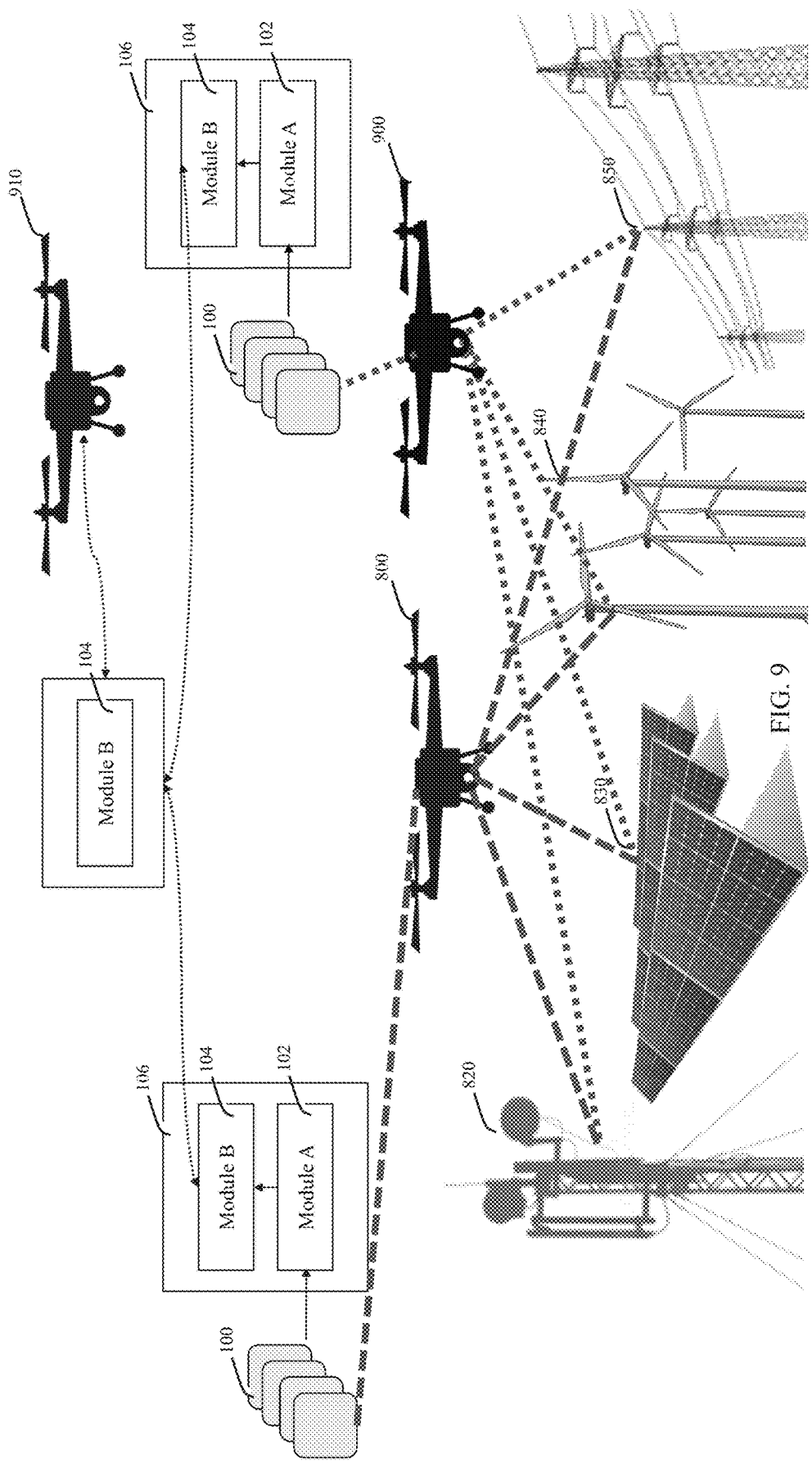
FIG. 9 extends the drone-based industrial inspection use case of FIG. 8 to a situation with multiple L-DNN-carrying drones operating in concert.

FIG. 9 illustrates how the L-DNN technology described herein can be applied as a generalized case of FIG. 8, where multiple drones (for instance, dumb drones 800 and 900 and smart drone 910) collect data synchronously or asynchronously. The information learned by the L-DNN associated with each drone can be merged (combined or melded) and pushed back to the other drones, shared peer-to-peer among drones, or shared with a central server that contains a Module B 104. The central server merges the individual L-DNN learned information and pushes the merged information back to all drones, including drone 910, which has not been exposed to the information about telecommunication towers 820, solar panel arrays 830, wind turbine farm 840, or power line distribution 850 derived from data acquired by drones 800 and 900, but is now able to understand and classify these items thanks to the merging process.

Using L-DNN to Automate Warehouse Operations: Consolidating and Melding Knowledge from Multiple Sources The system described above can be extended for multiple machines or cameras (fixed, drone bound, etc.) that operate in concert. Consider a company with large warehouses in multiple varied geographic locations. Taking manual inventory in large warehouses can take many man-hours and usually requires the warehouses to be shut during this time. Existing automated solutions have difficulty identifying stacked objects that may be hidden. In addition, in existing automated solutions, information that is learned at one geographic location is not transferred to other locations. In some instances, because of the vast amount of data that is collected at different geographic locations, these automated solutions can take weeks to learn new data and act upon the new data.

Figure 10:
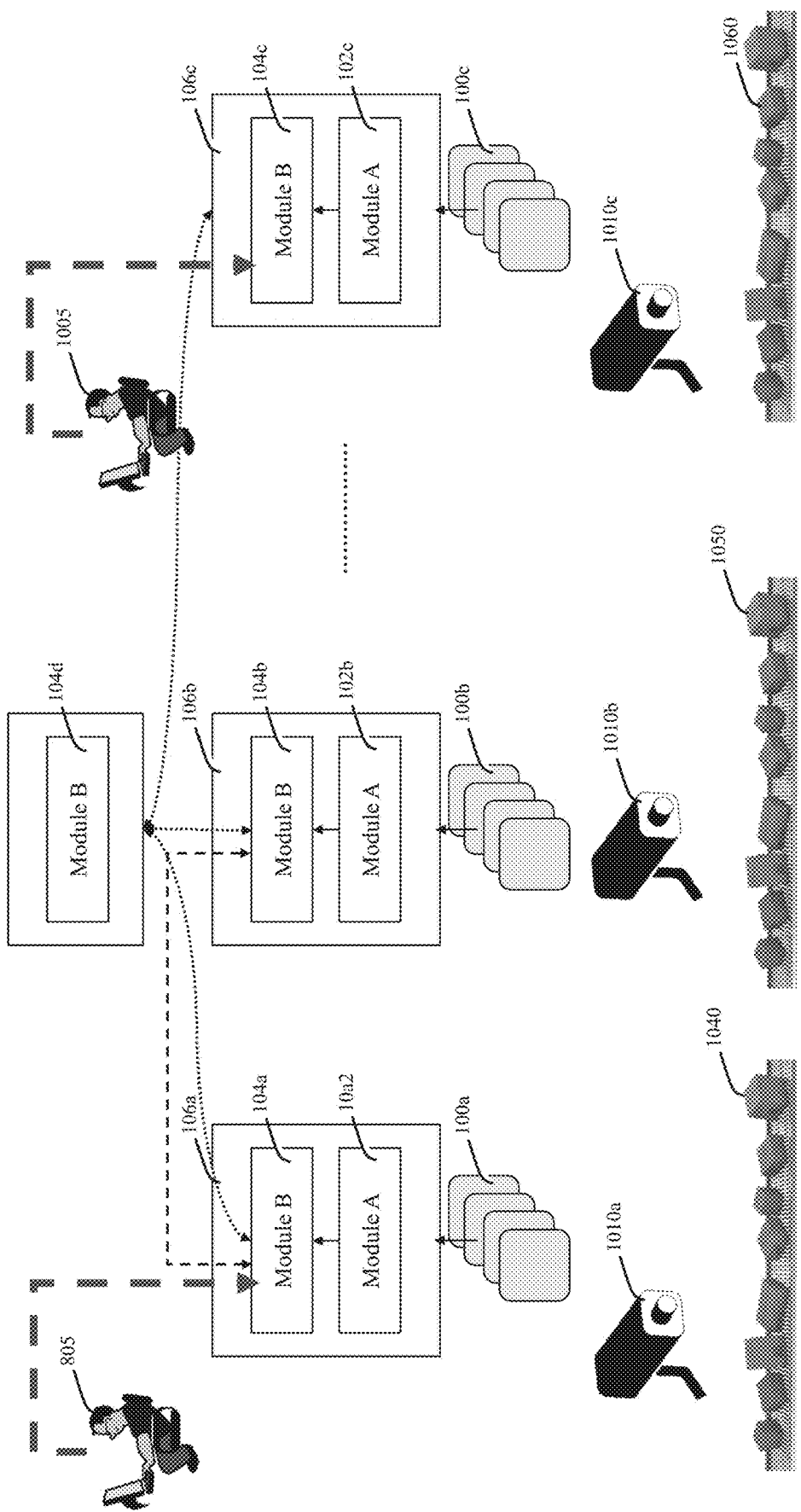
FIG. 10 illustrates an application of an L-DNN to a warehouse inventory use case.

In contrast, the L-DNN technology described herein can be applied to a warehouse, industrial facility, or distribution center environment as shown in FIG. 10, where sensors (e.g., fixed cameras 1010*a*-1010*c* or moving cameras mounted on robots or drones) can learn on-the-fly new items in inventory via various L-DNN modules connected to the sensors. Additionally, operators in 805 and 1005 could teach new information to various L-DNN modules in a decentralized fashion. This new knowledge can be integrated centrally or communicated peer-to-peer and pushed back after melding to each individual device (e.g., camera 1010).

For instance, consider the fixed cameras 1010*a*-1010*c* (collectively, cameras 1010) in FIG. 10. Each of these cameras 1010 acquires corresponding video imagery 100 of objects on a conveyor belt and provides that imagery 100 to a corresponding L-DNN 106a-106c (collectively, L-DNNs 106). The L-DNNs 106 recognize known objects in the imagery 100, e.g., for inspection, sorting, or other distribution center functions.

Each L-DNN 106 tags unknown objects for evaluation by human operators 805 and 1005 or as "nothing I know." For instance, when presented with an unknown object 1040, L-DNN 106a flags the unknown object 1040 for classification by human operator 805. Similarly, L-DNN 106c flags unknown object 1060 for classification by human operator 805. When L-DNN 106b is presented with an unknown object 1050, it simply tags the unknown object 1050 as "nothing I know." A standalone Module B 104d coupled to the L-DNNs 106 merges the knowledge acquired by L-DNNs 106a and 106c from the human operators 805 and 1005 and pushes it to the Module B 104b in L-DNN 106b so that Module B 104b can recognize future instances of objects 1040 and 1060.

The L-DNN 106 for each device can be pre-trained to recognize existing landmarks in the warehouses, such as pole markings, features like EXIT signs, a combination thereof, and/or the like. This enables the system to triangulate a position of the unmanned vehicle equipped with a sensor or appearing in an image acquired by a sensor (e.g., a camera 1010). The L-DNN in each vehicle operate in exact same way as in the use case described above. In this manner, knowledge from multiple unmanned vehicles can be consolidated, melded, and redistributed back to each unmanned vehicle. The consolidation and melding of knowledge from all locations can be carried out by a central server as described in the consolidation and melding section above; additionally, peer-to-peer melding can be applied as well. Thus, inventory can be taken at multiple warehouses and the knowledge consolidated with minimal disruption to warehouse operations.

Using L-DNNs in a Fleet of Mobile Devices

Figure 11:
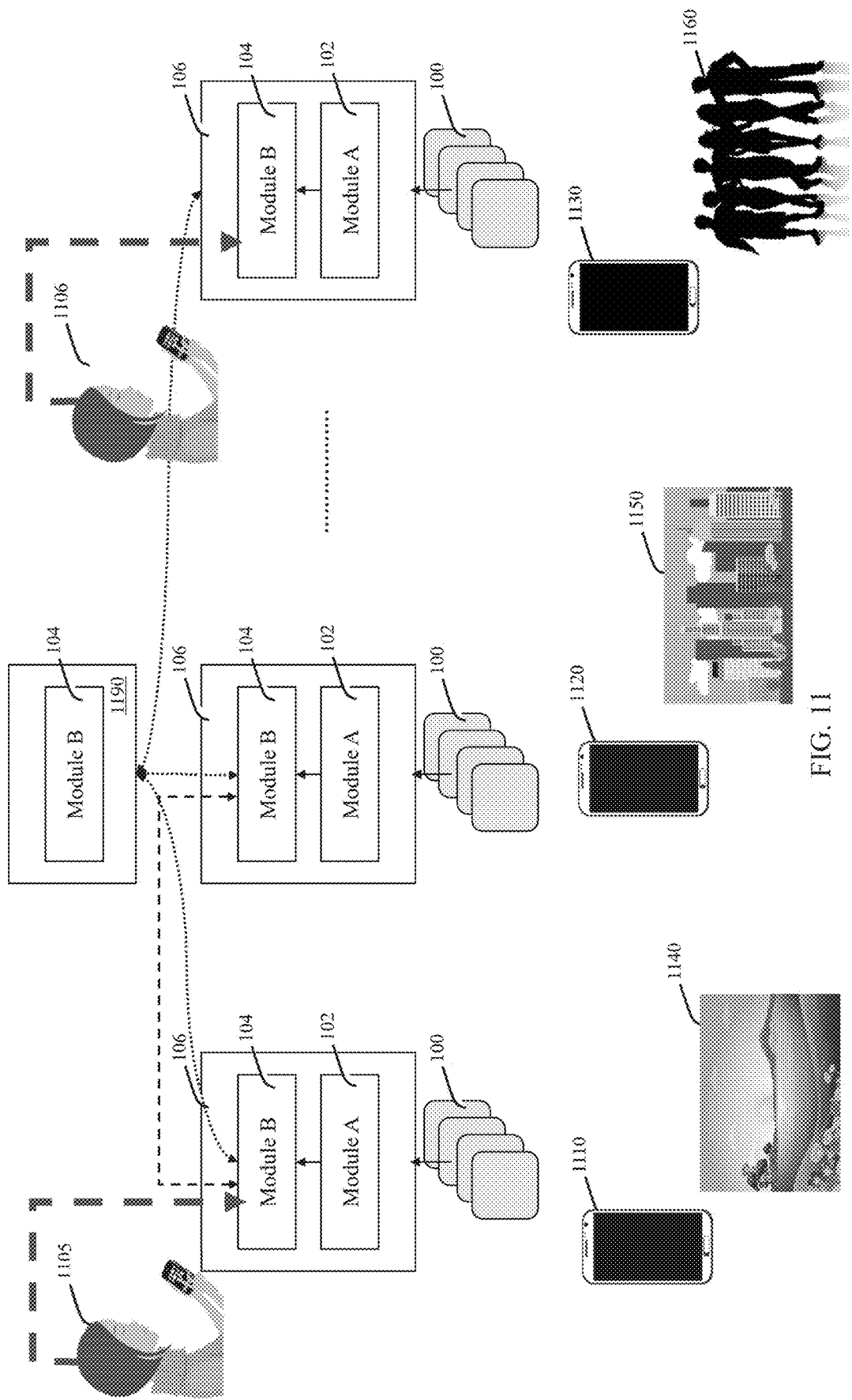
FIG. 11 illustrates a multitude of smart devices using an L-DNN to collectively acquire and share knowledge.

Consider distributed networks of consumer mobile devices, such as consumer smart phones and tablets, or professional devices, such as the mobile cameras, body-worn cameras, and LTE handheld devices used by first responders and public safety personnel for public safety. Consumer devices can be used to understand the consumer's surroundings, such as when taking pictures. In these cases, L-DNN technology described herein can be applied to smart phone or tablet devices 1110, 1120, and 1130 shown in FIG. 11. Individuals (e.g., users 1105 and 1106) could teach knowledge to the L-DNN modules 106 in devices 1110 and 1130, respectively, and merge this information peer-to-peer or on a server 1190 containing a Module B 104. The server 1190 pushes the merged knowledge back to some or all connected devices, possibly including devices that did not participate in the original training 1020.

The L-DNN modules can learn, for example, to apply image processing techniques to pictures taken by users, where users teach each L-DNN some customized actions associated with aspects of the picture (e.g., apply a filter or image distortion to these classes of objects, or areas). The combined learned actions could be shared, merged, or combined peer-to-peer or collectively across devices. Additionally, L-DNN technology can be applied to the generalized use case of smart phone usage, where input variables can be sensory or non-sensory (any pattern of usage of the smart phone). These patterns of usages, which can be arbitrary combinations of input variables and output variables, can be learned at the smart phone level, and pushed to a central L-DNN module 104, merged, and pushed back to individual devices.

In another example, a policeman can be looking for a lost child, a suspect, or a suspicious object using a professional device running an L-DNN. In such a situation, officers and/or first responders cannot afford to waste time. Existing solutions provided to officers and/or first responders require video feeds from the cameras to be manually analyzed and coordinated. Such solutions take too long since they require using a central server to analyze and identify objects. That is, such solutions have major latency issues since the video data needs to be analyzed in the cloud/central server. This could be a serious hurdle for first responders/officers who often need to act immediately as data is received. In addition, sending video data continuously to the central server can put a strain on communication channels.

Instead, by using L-DNN in mobile phones, body-worn cameras, and LTE handheld devices, data can be learned and analyzed on the edge itself. Consumers can learn to customize their device in-situ, and officers/first responders can look for and provide a location of the person/object as well as search and identify the person/object of interest in places that the officers might not be actively looking at. The L-DNN can utilize a fast learning mode to learn from an officer on the device in the field instead of learning from an operator on a remote sever, reducing or eliminating latency issues associated with centralized learning.

FIG. 1 can illustrate the operation of an L-DNN in a mobile phone for labeling components in an image as a consumer points the phone to a scene and labels the whole scene or sections of the scene (objects, section of scene, such as sky, water, etc.). Additionally, a police officer can access video frames and identifying suspicious person/object. When the mobile phone acquires video frames 100, a Module A 102 can extract image features from these frames based on pre-trained data. A Module B 104 can then provide a probable label for each object using these features. For instance, if person A lives in a neighborhood B and has been observed in neighborhood B in the past, then person A may be labeled as a "resident" of neighborhood B. Thus, the fast learning subsystem can utilize one-trial learning to determine the relative positions and features of already learned objects, such as, houses, trees, as early as immediately after the first frame of learning. More importantly, a dispatcher on the central server 110 can introduce a new object to find to the server-side L-DNN, and it will be melded and distributed to local first responders as needed.

This use case is very similar to the previous use cases, but takes greater advantage of L-DNN's ability to learn new objects quickly without forgetting old. While during inspections and inventory collections there is usually little time pressure and memory consolidation can be done in the slow learning mode, in the case of first responders it can be important to consolidate and meld knowledge from multiple devices as fast as possible so that all devices in the area can start searching for the suspect or missing child. Thus, the ability of L-DNN to quickly learn a new object guided by one first responder, almost instantaneously consolidate it on the server and distribute to all first responders in the area becomes a tremendous advantage for this use case.

Replacing Conventional DNNs with L-DNNs in Data Centers

Figure 12:
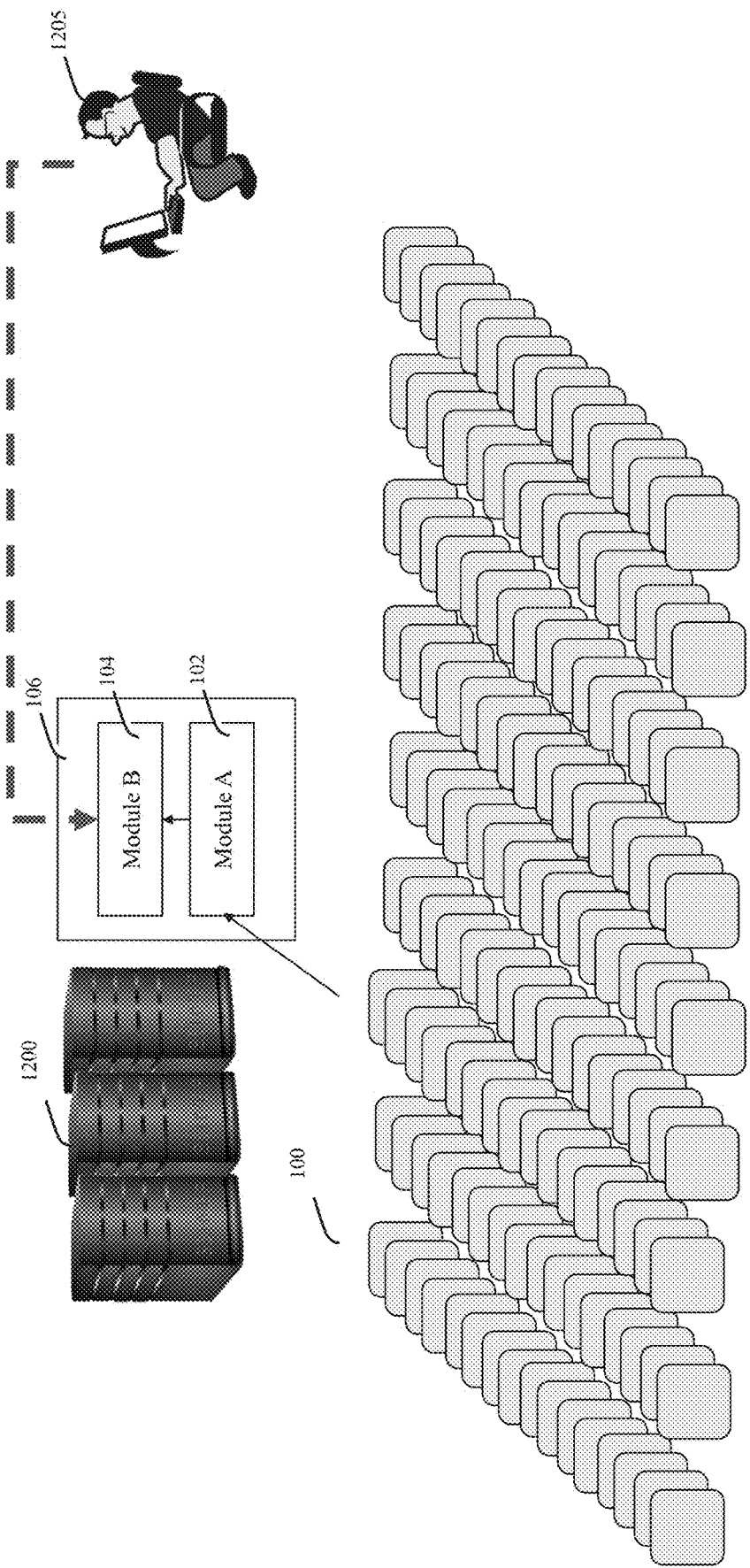
FIG. 12 illustrates a case where an L-DNN replaces a conventional DNN in a data center-based application.

The L-DNN technology described herein can be applied as shown in FIG. 12 as a tool to decrease computational time for DNN processes in individual compute nodes or servers 1200 in large data centers. L-DNN technology speeds up learning in DNN by several orders of magnitude. This feature can be used to dramatically decrease the need in, or cut the consumption of, computational resources on the servers, where information can be learned over few seconds across massive datasets 100 that usually requires hours/days/weeks of training time. The use of L-DNN also results in reduction of power consumption, and overall better utilization of server resources 1200 in data centers.

CONCLUSION

As described above, an L-DNN can provide on-the-fly (one-shot) learning for neural network systems. Conversely, traditional DNNs often require thousands or millions of iteration cycles to learn a new object. The larger the step size taken per iteration cycle, the less likely that the gradient of the loss function can lead to actual performance gains. Hence, these traditional DNN make small changes to their weights per training sample. This makes it extremely difficult to add new knowledge on-the-fly. In contrast, an L-DNN with fast learning neural networks can learn stable object representations with very few training examples. In some instances, just one training example can suffice for an L-DNN.

Because an L-DNN uses a fast training neural network in addition to a conventional DNN, it is resistant to the "catastrophic forgetting" that plagues traditional DNNs. In catastrophic forgetting, as new inputs are provided to a DNN, all weights in the DNN are adjusted with every sample presentation, causing the DNN to "forget" how to classify the old inputs as it learns the new inputs. Catastrophic forgetting can be avoided by simply re-learning the complete set of inputs, including the new ones, but re-learning can take too long to be practical. Some existing approaches either selectively freeze weights based on importance of the weights, train subnetworks of the DNN, or use a modular approach to avoid catastrophic forgetting. However, such approaches are both slow and require multiple iteration cycles to train the DNN. In contrast, an L-DNN provides ways to achieve fast and stable learning capacity without re-training. An L-DNN also facilitates stable learning of object representations with a single example and/or in a single iteration cycle.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of implementing a Lifelong Learning Deep Neural Network (L-DNN) including a slow-learning subsystem and a fast-learning subsystem having previously determined weights in a real-time operating machine, the method comprising:
   predicting, by the L-DNN, a first action for the real-time operating machine based on (i) an observation, by a sensor, of an environment of the real-time operating machine, (ii) weights of the fast-learning subsystem, and (iii) features extracted from the observation by the slow-learning subsystem;
   determining, by the L-DNN, a mismatch between an expectation and a perception of the real-time operating machine based on the observation;
   in response to the mismatch, triggering a fast learning mode by the L-DNN, the fast learning mode updating a weight vector of a corresponding category node of the fast-learning subsystem based on the observation or adding a category node with a weight vector based on the observation to the fast-learning subsystem without changing the previously determined weights of the slow-learning subsystem;
   consolidating the weights of the fast-learning subsystem to restrict a memory footprint by the fast-learning subsystem and bound memory growth of the L-DNN to no faster than linear with a number of objects that the L-DNN is trained to recognize; and
   applying the consolidated weights of the fast-learning subsystem to predict a second action for the real-time operating machine based on a subsequent observation, by the sensor, of the environment of the real-time operating machine.

2. The method of claim 1, further comprising:
   determining that the real-time operating machine is offline; and
   in response to determining that the real-time operating machine is offline, triggering a slow learning mode, the slow learning mode modifying the previously determined weights of the slow-learning subsystem.

3. A method of classifying an object with a lifelong deep neural network comprising a deep neural network (DNN) and a classifier running on a real-time operating machine and trained to recognize objects in a plurality of categories, the method comprising:
   presenting a first representation of an object to the lifelong deep neural network;
   determining, by the lifelong deep neural network, a plurality of confidence levels based on the first representation, each confidence level in the plurality of confidence levels representing a likelihood that the object falls into a corresponding category in the plurality of categories;
   performing a comparison of the plurality of confidence levels based on the first representation to a dynamic threshold greater than an average of the plurality of confidence levels based on the first representation;
   determining that the object does not fall into any of the plurality of categories based on the comparison;
   in response to determining that the object does not fall into any of the plurality of categories, classifying the object as falling into a category which the lifelong deep neural network has not been trained to recognize;
   receiving, from a user, a label for the object; and
   adding, by the classifier to the plurality of categories, a new category for the object based on the label for the object and a set of features of the object extracted from the first representation of the object by the DNN.

4. The method of claim 3, wherein performing the comparison comprises:
determining that no confidence level in the plurality of confidence levels exceeds the dynamic threshold.

5. An apparatus comprising:
a sensor to collect a data stream representing an object in an environment; and
at least one processor operably coupled to the sensor, the at least one processor executing:
a pre-trained deep neural network, the pre-trained deep neural network including a stack of convolutional layers to extract features of the object from the data stream and to generate a convolutional output based on the extracted features; and
a one-shot learning classifier operating in real-time to:
determine activations across a plurality of categories of known objects in the one-shot learning classifier based on the convolutional output;
determine a distribution of the activations;
compare the distribution of the activations to a threshold based at least in part on the activations in the distribution of activations;
in response to determining that the distribution indicates that no activation is a single winning activation, classify the object as belonging to a first category in the plurality of categories, the first category representing previously unlabeled objects;
in response to a label from a user, add a new category to the plurality of categories, the new category representing the object; and
in response to determining a winning activation based on the distribution, classify the object as belonging to a second category in the plurality of categories, the winning activation corresponding to the second category.

6. The apparatus of claim 5, wherein the one-shot learning classifier classifies the object as belonging to the first category such that a recognition mode and a learning mode of the one-shot learning classifier are affected.

7. The apparatus of claim 5, wherein each of the activations is based on at least one of a dot product or a Euclidean distance.

8. The apparatus of claim 5, wherein the threshold is greater than an average of the activations.

9. An apparatus for real-time operation on continuous sensory input data to learn objects on-the-fly, the apparatus comprising:
at least one processor executing:
a convolutional deep neural network to extract features from the continuous sensory input data; and
an Adaptive Resonance Theory (ART) classifier operating in real-time to classify objects represented by the continuous sensory input data based on the features extracted by the convolutional deep neural network, the ART classifier having a first layer to perform a comparison of the features extracted by the convolutional deep neural network to weights and a second layer comprising category nodes to generate respective activations based on the comparison, the ART classifier having:
(i) a recognition mode with a "Nothing I know" category to classify previously unseen and unlabeled objects if none of the respective activations matches a label previously learned by the ART classifier, and
(ii) a one-shot learning mode in which the ART classifier creates a new category node, based on a new label from a user, representing one of the previously unseen and unlabeled objects in the "Nothing I know" category without changing the convolutional deep neural network, and adds the new category node to the second layer for recognizing subsequent instances of the one of the previously unseen and unlabeled objects.

10. The apparatus of claim 9, wherein the "Nothing I know" category prevents the ART classifier from erroneously classifying the previously unseen and unlabeled objects.

11. The apparatus of claim 9, wherein the ART classifier is configured to classify the previously unseen and unlabeled objects based on activations across a plurality of category nodes.

12. The apparatus of claim 11, wherein the ART classifier is configured to classify the previously unseen and unlabeled objects in the "Nothing I know" category if a distribution of the activations indicates that no category is a single winning category.

* * * * *